(12) United States Patent  (10) Patent No.: US 12,313,901 B2
Iwasaki et al.  (45) Date of Patent: May 27, 2025

(54) LENS BARREL

(71) Applicant: FUJIFILM Corporation, Tokyo (JP)

(72) Inventors: Hiroyuki Iwasaki, Saitama (JP); Yuichi Kawanabe, Saitama (JP); Shinji Otsuka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 654 days.

(21) Appl. No.: 17/564,866

(22) Filed: Dec. 29, 2021

(65) Prior Publication Data

US 2022/0121000 A1  Apr. 21, 2022

Related U.S. Application Data

(63) Continuation of application No. PCT/JP2020/028073, filed on Jul. 20, 2020.

(30) Foreign Application Priority Data

Jul. 24, 2019  (JP) .................................. 2019-135988

(51) Int. Cl.
G02B 7/09 (2021.01)
G02B 7/14 (2021.01)

(52) U.S. Cl.
CPC . *G02B 7/09* (2013.01); *G02B 7/14* (2013.01)

(58) Field of Classification Search
CPC ... G02B 7/09; G02B 7/14; G02B 7/04; G02B 7/08; G02B 7/021

(Continued)

(56) References Cited

U.S. PATENT DOCUMENTS

2002/0135896 A1* 9/2002 Nomura ................ G02B 7/023
                                                  359/830
2004/0042092 A1* 3/2004 Nomura ................ G02B 7/102
                                                  359/819

(Continued)

FOREIGN PATENT DOCUMENTS

CN  1860396 A  11/2006
CN  101995638 A  3/2011

(Continued)

OTHER PUBLICATIONS

International Search Report issued in PCT/JP2020/028073; mailed Oct. 6, 2020.

(Continued)

*Primary Examiner* — William R Alexander
*Assistant Examiner* — Mackenzi Waddell
(74) *Attorney, Agent, or Firm* — Studebaker Brackett PLLC

(57) ABSTRACT

Provided is a lens barrel capable of improving stop accuracy. A roller support shaft (61) is attached to an outer peripheral portion of a cam cylinder (16). A torque applying roller (102) is rotatably supported by the roller support shaft (61). A biasing ring (104) is fitted to an outer peripheral portion of a second fixed cylinder (12B) and is held to be movable in an axial direction. The biasing ring (104) is biased by a biasing spring (106) and pressed to abut against the torque applying roller (102). In a case where the cam cylinder (16) is rotated, the torque applying roller (102) rolls along the biasing ring (104). A load torque is applied to the rotation of the cam cylinder (16) by frictional force generated between the torque applying roller (102) and the roller support shaft (61) due to the rotation of the torque applying roller (102).

11 Claims, 23 Drawing Sheets

(58) Field of Classification Search
USPC .............. 359/699, 704, 701, 700, 703, 826
See application file for complete search history.

(56) References Cited

U.S. PATENT DOCUMENTS

| | | | |
|---|---|---|---|
| 2006/0268436 A1* | 11/2006 | Sasaki | G02B 7/021 |
| | | | 359/822 |
| 2008/0019685 A1* | 1/2008 | Ishizuka | G02B 7/102 |
| | | | 396/349 |
| 2011/0032626 A1 | 2/2011 | Tsuji | |
| 2012/0113535 A1* | 5/2012 | Okuda | G03B 17/14 |
| | | | 359/823 |
| 2014/0043526 A1 | 2/2014 | Noguchi | |
| 2015/0192756 A1* | 7/2015 | Uno | G03B 3/10 |
| | | | 359/696 |
| 2016/0004030 A1* | 1/2016 | Shiramizu | G02B 7/102 |
| | | | 359/826 |

FOREIGN PATENT DOCUMENTS

| | | |
|---|---|---|
| JP | 2008-224949 A | 9/2008 |
| JP | 2009-075328 A | 4/2009 |
| JP | 2009-162822 A | 7/2009 |
| JP | 2011-133592 A | 7/2011 |
| JP | 2013-257369 A | 12/2013 |
| JP | 2014-035438 A | 2/2014 |

OTHER PUBLICATIONS

International Preliminary Report On Patentability and Written Opinion issued in PCT/JP2020/028073; issued Jan. 25, 2022.

A Notice of Allowance mailed by China National Intellectual Property Administration on May 31, 2023, which corresponds to Chinese Patent Application No. 202080052464.0 and is related to U.S. Appl. No. 17/564,866; with English language translation.

\* cited by examiner

LENS BARREL

CROSS-REFERENCE TO RELATED APPLICATIONS

The present application is a Continuation of PCT International Application No. PCT/JP2020/028073 filed on Jul. 20, 2020 claiming priority under 35 U.S.C § 119(a) to Japanese Patent Application No. 2019-135988 filed on Jul. 24, 2019. Each of the above applications is hereby expressly incorporated by reference, in its entirety, into the present application.

BACKGROUND OF THE INVENTION

1. Field of the Invention

The present invention relates to a lens barrel, and particularly relates to a lens barrel that is rotationally driven.

2. Description of the Related Art

JP2011-133592A discloses that a thrust ring is made to abut against an end surface of a cam cylinder that is rotationally driven and the cam cylinder is biased in an optical axis direction to reduce backlash of the cam cylinder and to improve stop accuracy of the cam cylinder.

SUMMARY OF THE INVENTION

One embodiment according to the technique of the present disclosure provides a lens barrel capable of improving stop accuracy.

(1) A lens barrel comprising: a first cylinder having a first groove disposed along an axial direction and a second groove disposed along a circumferential direction; a second cylinder having a cam groove and rotatably held by being fitted to an inner peripheral portion of the first cylinder; a third cylinder accommodated in the second cylinder and held to be movable in the axial direction; a cam follower attached to an outer peripheral portion of the third cylinder and fitted to the cam groove and the first groove; a roller support shaft attached to an outer peripheral portion of the second cylinder through the second groove; a first roller supported by the roller support shaft; a first frame fitted to an outer peripheral portion of the first cylinder and held to be movable in the axial direction; and a biasing member that biases the first frame in the axial direction and presses the first frame to make the first frame abut against the first roller.

(2) The lens barrel according to (1), further comprising: a second roller supported by the roller support shaft and fitted to the second groove to position the second cylinder in the axial direction with respect to the first cylinder and/or regulate a movable range of the second cylinder.

(3) The lens barrel according to (2), in which any one of the first roller or the second roller is composed of a bearing.

(4) The lens barrel according to any one of (1) to (3), in which the second cylinder has a pair of the cam grooves disposed in parallel with each other, and a pair of the cam followers individually fitted to the pair of cam grooves is provided.

(5) The lens barrel according to (4), in which the third cylinder has a third cylinder body part, a third cylinder movable part fitted to an outer peripheral portion of the third cylinder body part and held to be movable in the axial direction, and a biasing part biasing the third cylinder movable part in the axial direction with respect to the third cylinder body part, and one of the pair of cam followers is attached to the third cylinder movable part, and the other is attached to the third cylinder body part.

(6) The lens barrel according to any one of (1) to (5), in which in the second cylinder, an opening portion of the cam groove is shielded by the third cylinder in an entire movable area of the third cylinder.

(7) The lens barrel according to (5), in which in the second cylinder, an opening portion of the cam groove is shielded by the third cylinder body part and the third cylinder movable part in an entire movable area of the third cylinder by mounting the third cylinder movable part on the third cylinder body part.

(8) The lens barrel according to any one of (1) to (7), further comprising: a second frame fixedly mounted on the outer peripheral portion of the first cylinder, in which the biasing member is composed of a spring disposed between the first frame and the second frame.

(9) The lens barrel according to any one of (1) to (7), in which the first cylinder has a flange portion, and the biasing member is composed of a spring disposed between the first frame and the flange portion.

(10) The lens barrel according to any one of (1) to (9), in which the cam follower has a shaft portion attached to the outer peripheral portion of the third cylinder, and a bearing mounted on the shaft portion and fitted to the cam groove and the first groove.

(11) The lens barrel according to any one of (1) to (10), further comprising: a driving unit that rotationally drives the second cylinder.

(12) The lens barrel according to (11), in which the driving unit has a motor, and a reduction gear that has a gear train and reduces a speed of rotation of the motor to transmit the speed-reduced rotation to the second cylinder.

(13) The lens barrel according to any one of (1) to (12), in which the third cylinder holds a lens in an inner peripheral portion.

DESCRIPTION OF THE PREFERRED EMBODIMENTS

Hereinafter, preferred embodiments of the present invention will be described with reference to the accompanying drawings.

First Embodiment

Here, a case where the present invention is applied to an interchangeable lens of a lens interchangeable camera will be described as an example. In a lens interchangeable camera, the interchangeable lens is attachably and detachably mounted on a camera body.

[Overall Outline Configuration]

Figure 1:
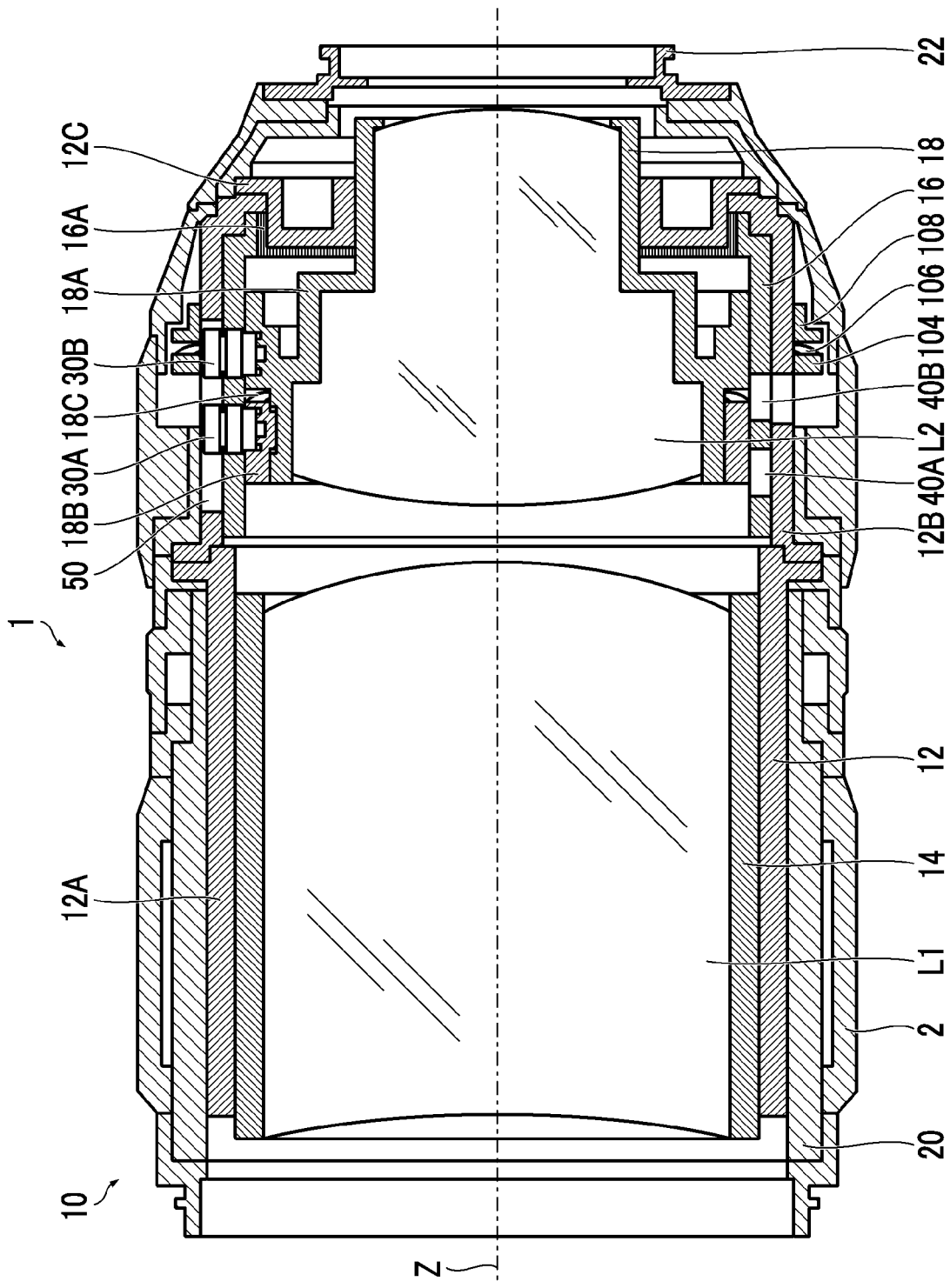
FIG. 1 is a cross-sectional view showing an overall schematic configuration of an interchangeable lens according to a first embodiment.

FIG. 1 is a cross-sectional view showing an overall schematic configuration of an interchangeable lens according to a first embodiment. An interchangeable lens 1 of the present embodiment is a so-called single focus AF lens. The AF lens is a lens capable of auto-focusing (AF). In particular, the interchangeable lens 1 of the present embodiment has a built-in motor for focusing.

As shown in FIG. 1, the interchangeable lens 1 of the present embodiment has a first lens group L1 and a second lens group L2 in order along an optical axis Z. The first lens group L1 is a fixed lens group. The second lens group L2 is a lens group that moves along the optical axis Z. The second lens group L2 is a focus lens group. Focusing is performed by moving the second lens group L2 along the optical axis Z.

A lens barrel 10 of the interchangeable lens 1 of the present embodiment is mainly composed of a fixed cylinder 12, a first lens cylinder 14, a cam cylinder 16, a second lens cylinder 18, an exterior body 20, a mount 22, and the like.

<Fixed Cylinder>

The fixed cylinder 12 is an element that is fixed to the camera body in a case where the interchangeable lens 1 is mounted on the camera body. The fixed cylinder 12 is constituted by integrating a first fixed cylinder 12A, a second fixed cylinder 12B, and a rear end cover 12C. The first fixed cylinder 12A and the second fixed cylinder 12B are coaxially connected by fastening flange portions thereof with screws (not shown). The rear end cover 12C is screwed to an end part of the second fixed cylinder 12B with a screw (not shown), thereby being attached to the end part of the second fixed cylinder 12B. The fixed cylinder 12 is an example of a first cylinder.

<First Lens Cylinder>

The first lens cylinder 14 is a frame for holding the first lens group L1. The first lens group L1 is positioned and held on an inner peripheral portion of the first lens cylinder 14. The first lens cylinder 14 is positioned and held on an inner peripheral portion of the first fixed cylinder 12A.

<Cam Cylinder>

The cam cylinder 16 is fitted to an inner peripheral portion of the second fixed cylinder 12B and is rotatably held by the inner peripheral portion of the second fixed cylinder 12B. The cam cylinder 16 is an example of a second cylinder.

<Second Lens Cylinder>

The second lens cylinder 18 is a frame for holding the second lens group L2. The second lens group L2 is positioned and held on an inner peripheral portion of the second lens cylinder 18. The second lens cylinder 18 is accommodated in an inner peripheral portion of the cam cylinder 16 and is held to be movable in an axial direction. The second lens cylinder 18 moves in a front-rear direction along the optical axis Z by rotating the cam cylinder 16. A drive mechanism and a position detection mechanism of the second lens cylinder 18 will be described below. The second lens cylinder 18 is an example of a third cylinder.

<Exterior Body>

The exterior body 20 constitutes the exterior of the interchangeable lens 1. The exterior body 20 is constituted by combining a plurality of elements. The elements constituting the exterior body 20 also include an operation member (for example, a focus ring 2) of the interchangeable lens 1. The exterior body 20 is fixedly attached to the fixed cylinder 12.

<Mount>

The mount 22 is provided at a rear end part of the lens barrel 10. The mount 22 is composed of, for example, a bayonet mount. The interchangeable lens 1 is attachably and detachably mounted on the camera body via the mount 22.

[Drive Mechanism of Second Lens Cylinder]

Figure 2:
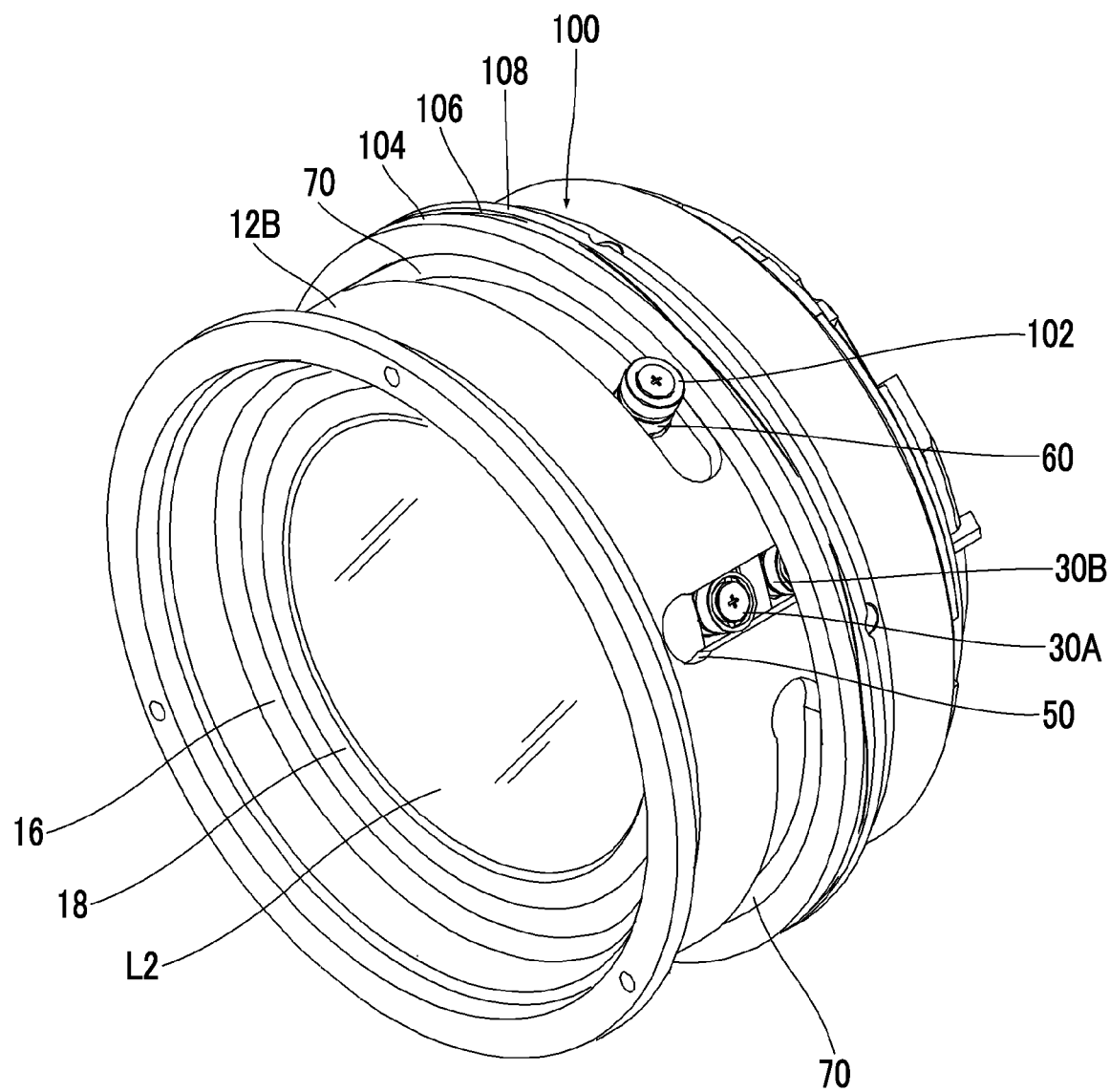
FIG. 2 is a perspective view of a rear portion of a lens barrel as viewed from the front side.
Figure 3:
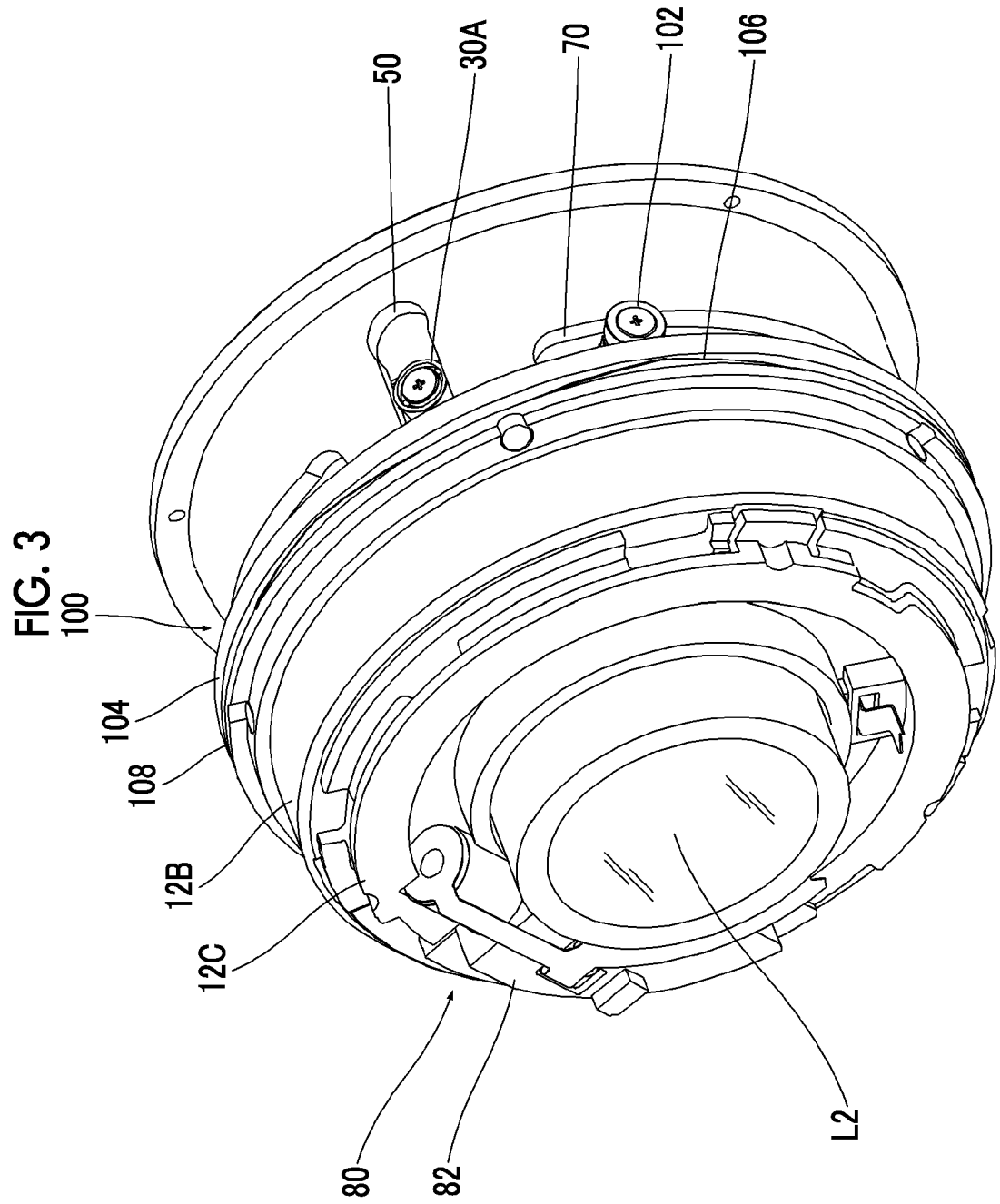
FIG. 3 is a perspective view of the rear portion of the lens barrel as viewed from the rear side.
Figure 4:
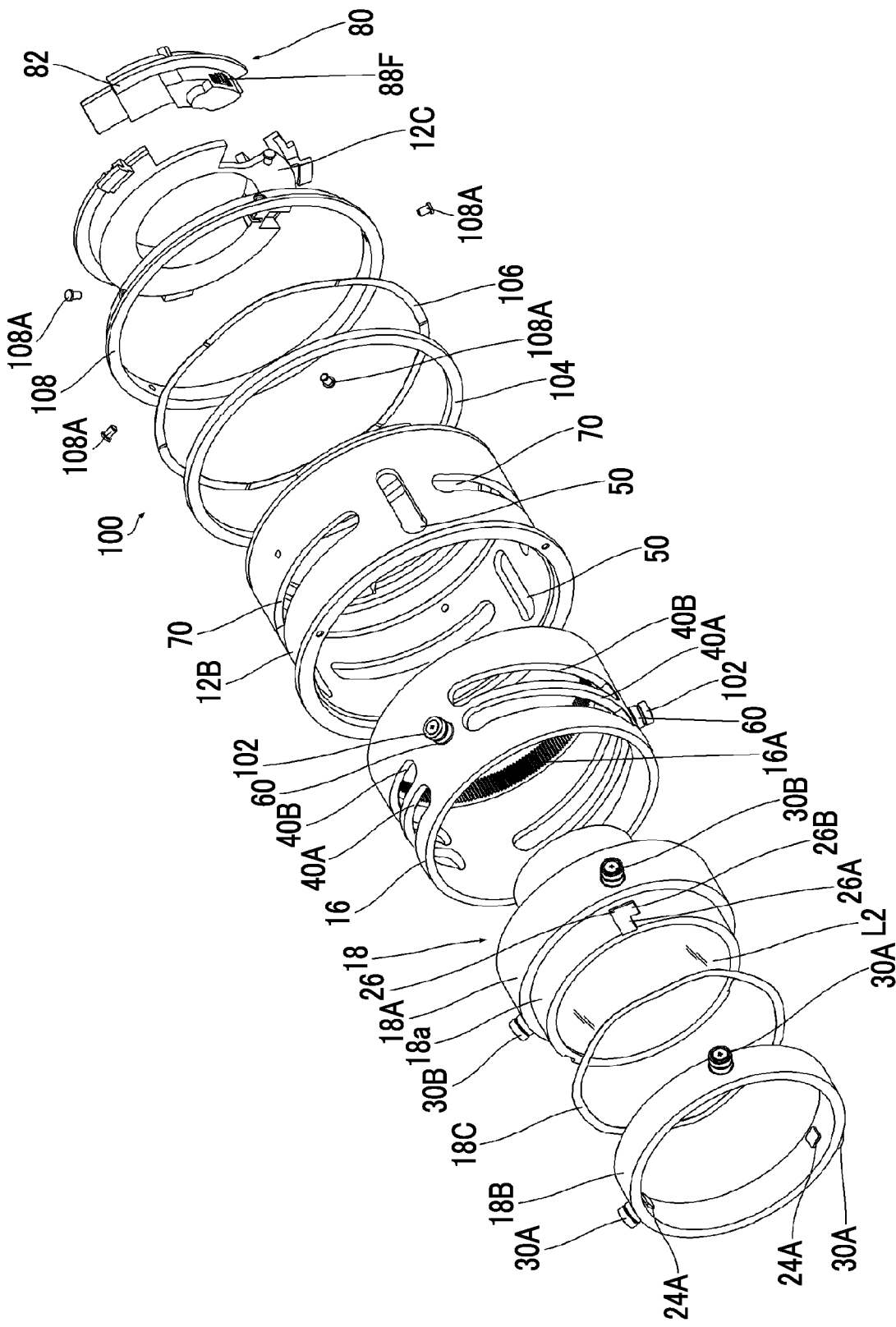
FIG. 4 is an exploded perspective view of the rear portion of the lens barrel.

FIGS. 2 and 3 are perspective views of a rear portion (a portion on the rear side with respect to the second fixed cylinder 12B of the fixed cylinder 12) of the lens barrel with the exterior body removed. FIG. 2 is a perspective view of the rear portion of the lens barrel as viewed from the front side. In addition, FIG. 3 is a perspective view of the rear portion of the lens barrel as viewed from the rear side. In addition, FIG. 4 is an exploded perspective view of the rear portion of the lens barrel.

The drive mechanism of the second lens cylinder 18 is composed of a so-called cam mechanism. The cam mechanism comprises a pair of cam followers 30A and 30B provided in the second lens cylinder 18, a pair of cam grooves 40A and 40B provided in the cam cylinder 16, a straight advance groove 50 provided in the second fixed cylinder 12B, a positioning roller 60 provided in the cam cylinder 16, a positioning groove 70 provided in the second fixed cylinder 12B, and a driving unit 80 for rotating the cam cylinder 16. In addition, the drive mechanism of the second lens cylinder 18 includes a torque applying mechanism 100 that applies a load torque to the rotation of the cam cylinder 16.

<Cam Follower>

The pair of cam followers 30A and 30B is provided at three locations on an outer peripheral surface of the second lens cylinder 18. The pairs of cam followers 30A and 30B are disposed at equal intervals along a circumferential direction. In each installation portion, the pair of cam followers 30A and 30B is disposed in the front-rear direction along the optical axis Z. Hereinafter, the cam follower 30A located on the front side (subject side) is referred to as a first cam follower 30A, and the cam follower 30B located on the rear side (image side) is referred to as a second cam follower 30B, as necessary, to distinguish between them.

Figure 5:
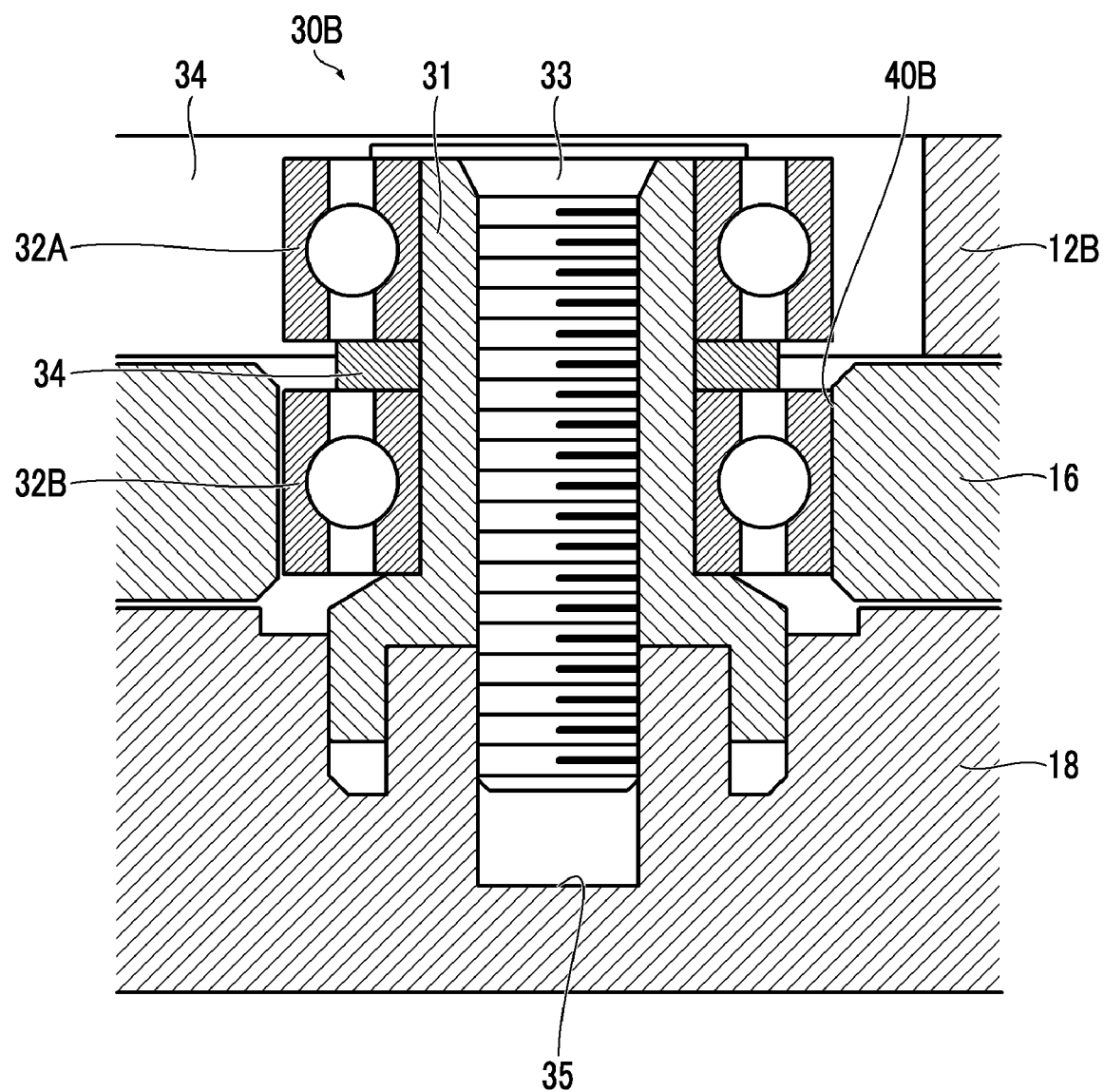
FIG. 5 is a cross-sectional view showing the configuration of a cam follower.

FIG. 5 is a cross-sectional view showing the configuration of the cam follower. Although FIG. 5 shows the second cam follower 30B, the first cam follower 30A has the same configuration.

As shown in FIG. 5, the cam follower has a shaft portion 31 and a pair of bearings 32A and 32B mounted on the shaft portion 31.

The shaft portion 31 has a cylindrical shape. A screw 33 is passed through a hollow portion of the shaft portion 31, and the shaft portion 31 is screwed to an outer peripheral portion of the second lens cylinder 18. The outer peripheral portion of the second lens cylinder 18 is provided with a screw hole 35 at a location where the shaft portion 31 is attached.

Each of the pair of bearings 32A and 32B is composed of a rolling bearing such as a ball bearing. The pair of bearings 32A and 32B is composed of a first bearing 32A located on the distal end side of the shaft portion 31 and a second bearing 32B located on the base end side of the shaft portion 31. A spacer 34 is disposed between the first bearing 32A and the second bearing 32B. An inner ring portion of each of the first bearing 32A and the second bearing 32B is lightly press-fitted to the shaft portion 31 and is mounted on the shaft portion 31. An outer ring portion of each of the first bearing 32A and the second bearing 32B mounted on the shaft portion 31 is rotatably held with respect to the shaft portion 31.

As shown in FIGS. 1 and 4, the second lens cylinder 18 has a body part 18A and a movable part 18B provided at the distal end of the body part 18A.

The movable part 18B has a cylindrical shape. The body part 18A has a fitting portion 18a to which the movable part 18B fits at the distal end. The fitting portion 18a is composed of a stepped portion, and is constituted by reducing the distal end portion of the body part 18A. The movable part 18B is fitted to the outer periphery of the fitting portion 18a and attached to the body part 18A. The body part 18A is an example of a third cylinder body part, and the movable part 18B is an example of a third cylinder movable part.

As a slip-off prevention mechanism, a protrusion 24 is provided on the inner periphery of the movable part 18B. On the other hand, a groove portion 26 is provided on the outer periphery of the fitting portion 18a. The protrusion 24 is provided at three locations on an inner peripheral surface of the movable part 18B. The groove portion 26 is composed of a groove to which the protrusion 24 is fitted. The groove portion 26 is provided at three locations on an outer peripheral surface of the fitting portion 18a. The groove portion 26 has an introduction portion 26A and a regulation portion 26B. The introduction portion 26A is formed from the distal end of the body part 18A along the optical axis Z. The regulation portion 26B is formed along the circumferential direction from an end part of the introduction portion 26A.

The movable part 18B is attached to the body part 18A by fitting the protrusion 24 to the regulation portion 26B of the groove portion 26. As a result, the movable part 18B is attached to the body part 18A by being prevented from slipping off.

The protrusion 24 is fitted to the regulation portion 26B with a certain play. That is, the width of the protrusion 24 in an optical axis direction is narrower than the width of the regulation portion 26B in the optical axis direction. As a result, the movable part 18B can be movably held along the optical axis Z in a state where the protrusion 24 is fitted to the regulation portion 26B.

In a case where the movable part 18B is attached to the body part 18A, the movable part 18B is attached to the body part 18A via a biasing spring 18C. The biasing spring 18C is composed of a wave washer. The wave washer is formed by bending a flat washer into a wavy shape, and by being crushed, acts as a spring to remove a gap in the axial direction. The biasing spring 18C is disposed between the movable part 18B and the body part 18A at a rear end part of the movable part 18B. As a result, the movable part 18B is biased toward a distal end direction along the optical axis Z with respect to the body part 18A.

The first cam follower 30A on the front side, which is one cam follower, is provided on the movable part 18B, and the second cam follower 30B on the rear side, which is the other cam follower, is provided on the body part 18A. As described above, the movable part 18B is biased toward a distal end direction along the optical axis Z with respect to the body part 18A. Therefore, the first cam follower 30A and the second cam follower 30B are biased in a direction of separating from each other along the optical axis Z.

<Cam Groove>

As shown in FIG. 4, the pair of cam grooves 40A and 40B is provided at three locations on a peripheral surface of the cam cylinder 16. A disposition interval of the pairs of cam grooves 40A and 40B is the same as the disposition interval of the pairs of cam followers 30A and 30B. That is, the pairs of cam grooves 40A and 40B are disposed at equal intervals along the circumferential direction. The pair of cam grooves 40A and 40B has the same shape (cam locus) and is disposed in the front-rear direction along the optical axis Z. Therefore, the pair of cam grooves 40A and 40B is disposed in parallel with each other. Hereinafter, the cam groove 40A located on the front side is referred to as a first cam groove 40A, and the cam groove 40B located on the rear side is referred to as a second cam groove 40B, as necessary, to distinguish between them.

Figure 6:
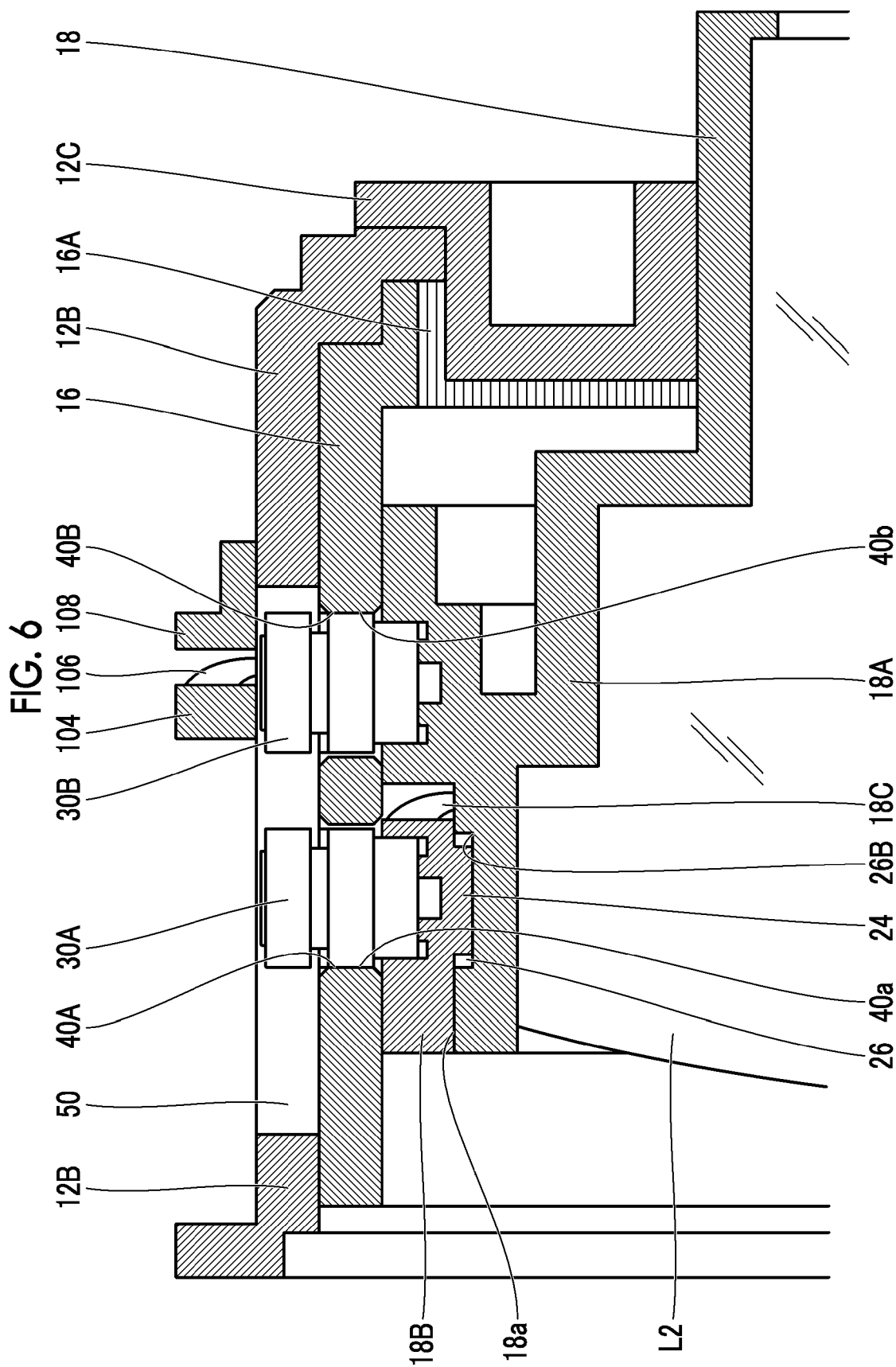
FIG. 6 is an enlarged cross-sectional view of an installation portion of a pair of the cam followers.

The pair of cam followers 30A and 30B is individually fitted to the pair of cam grooves 40A and 40B. That is, the first cam follower 30A is fitted to the first cam groove 40A, and the second cam follower 30B is fitted to the second cam groove 40B. FIG. 6 is an enlarged cross-sectional view of an installation portion of the pair of cam followers. As described above, the first cam follower 30A and the second cam follower 30B are biased in a direction of separating from each other along the optical axis Z by the biasing spring 18C. Therefore, in a case where the first cam follower 30A is fitted to the first cam groove 40A, the first cam follower 30A is pressed to abut against an inner wall surface 40a on the front side of the first cam groove 40A, thereby being fitted to the first cam groove 40A. On the other hand, in a case where the second cam follower 30B is fitted to the second cam groove 40B, the second cam follower 30B is pressed to abut against an inner wall surface 40b on the rear side of the second cam groove 40B, thereby being fitted to the second cam groove 40B. As a result, the backlash generated between the cam cylinder 16 and the second lens cylinder 18 can be removed, and the second lens cylinder 18 can be stably held with respect to the cam cylinder 16.

<Straight Advance Groove>

As shown in FIG. 4, the straight advance groove 50 is composed of a straight-shaped groove disposed along the optical axis Z. The straight advance groove 50 is provided at three locations on a peripheral surface of the second fixed cylinder 12B. A disposition interval of the straight advance grooves 50 is the same as the disposition interval of the pairs of cam followers 30A and 30B. That is, the straight advance grooves 50 are disposed at equal intervals along the circumferential direction. The pair of cam followers 30A and 30B is fitted to the same straight advance groove 50. The straight advance groove 50 is an example of a first groove.

<Positioning Roller>

The positioning roller 60 is a roller that positions the cam cylinder 16 in the optical axis direction with respect to the second fixed cylinder 12B. The positioning roller 60 also functions as a roller that regulates a rotation range of the cam cylinder 16.

As shown in FIG. 4, the positioning roller 60 is provided at three locations on an outer peripheral surface of the cam cylinder 16. The positioning rollers 60 are disposed at equal intervals along the circumferential direction.

Figure 7:
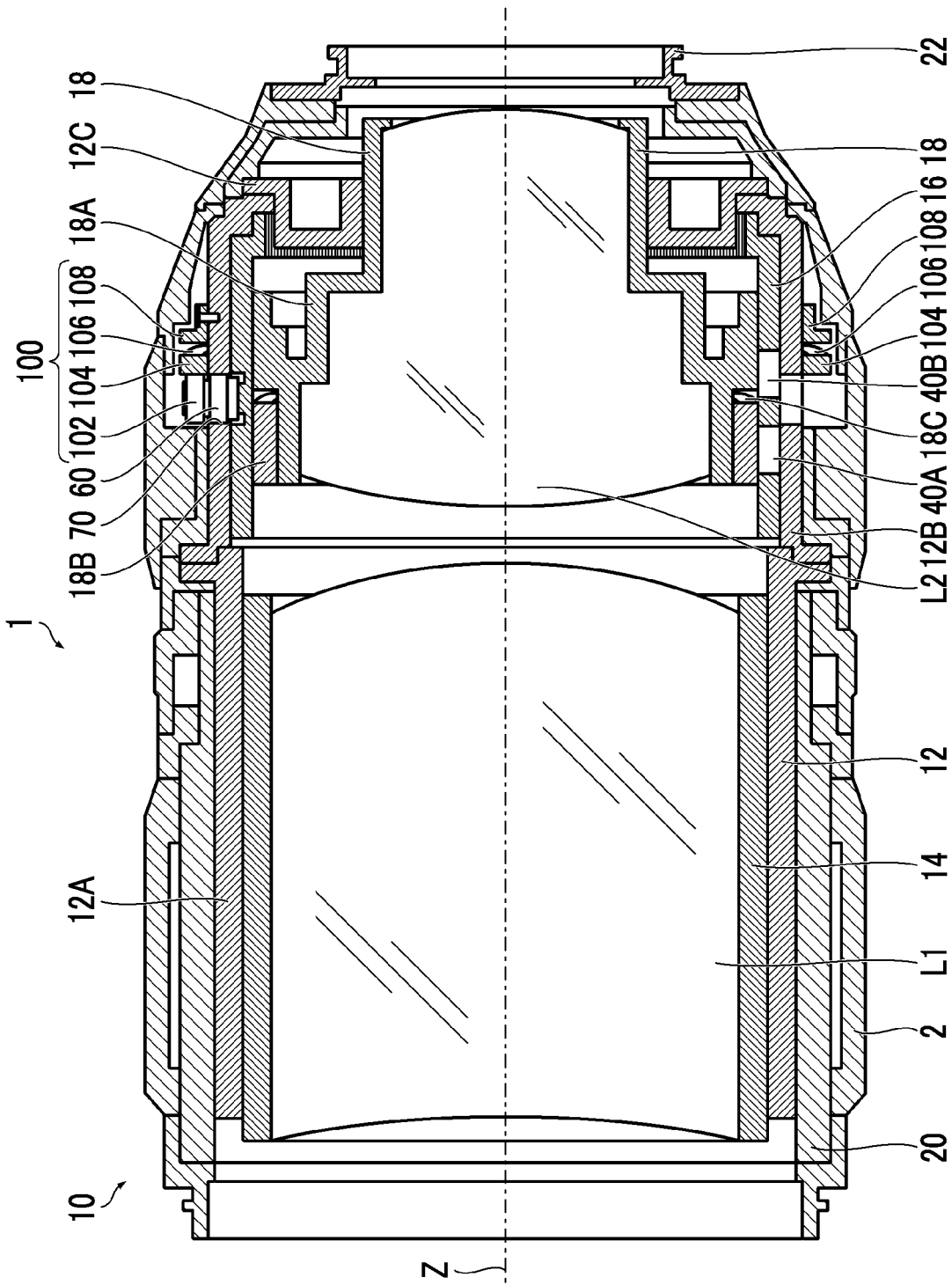
FIG. 7 is a cross-sectional view of the interchangeable lens at a location where a positioning roller is installed.
Figure 8:
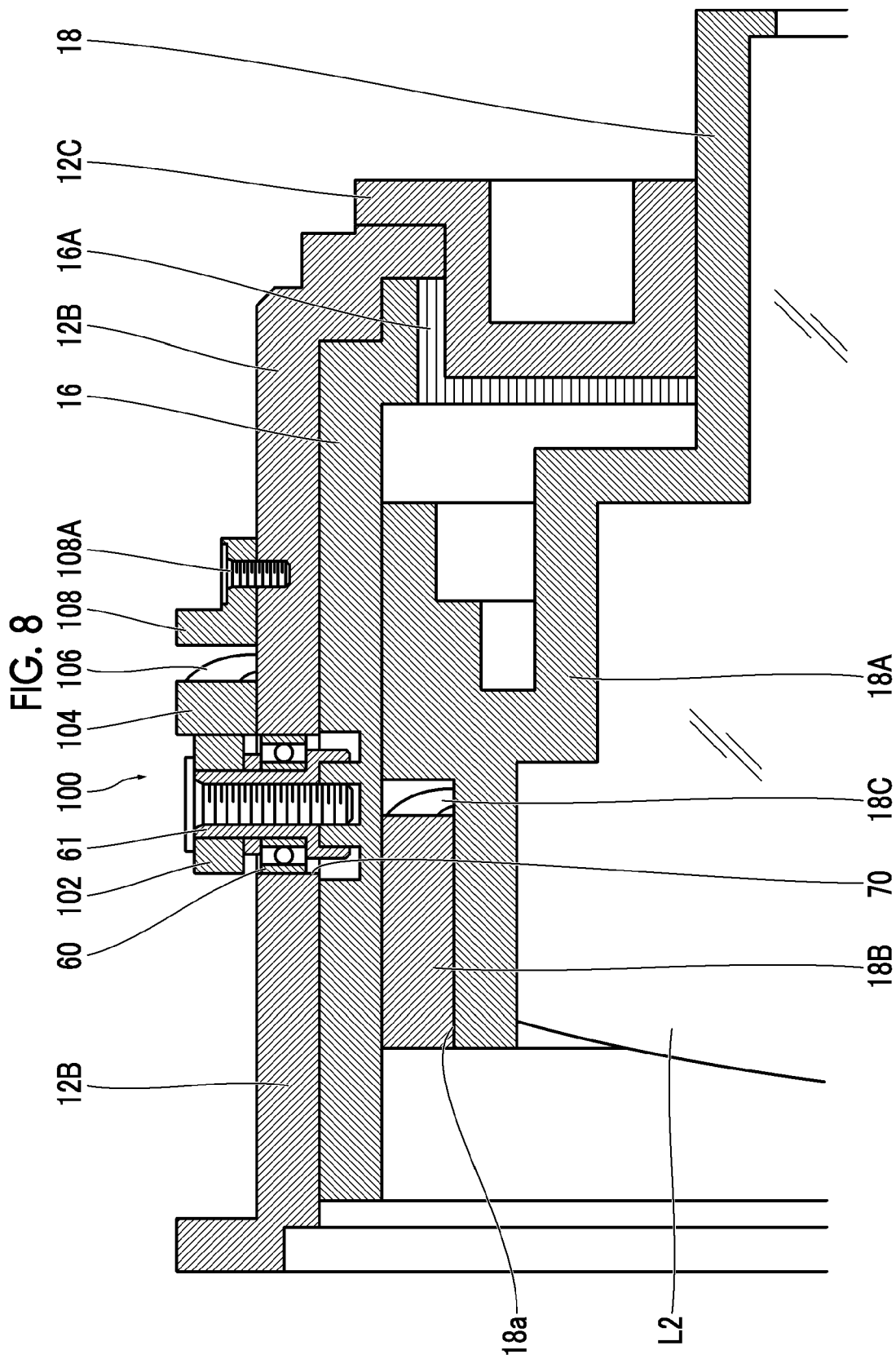
FIG. 8 is an enlarged cross-sectional view of an installation portion of the positioning roller.
Figure 9:
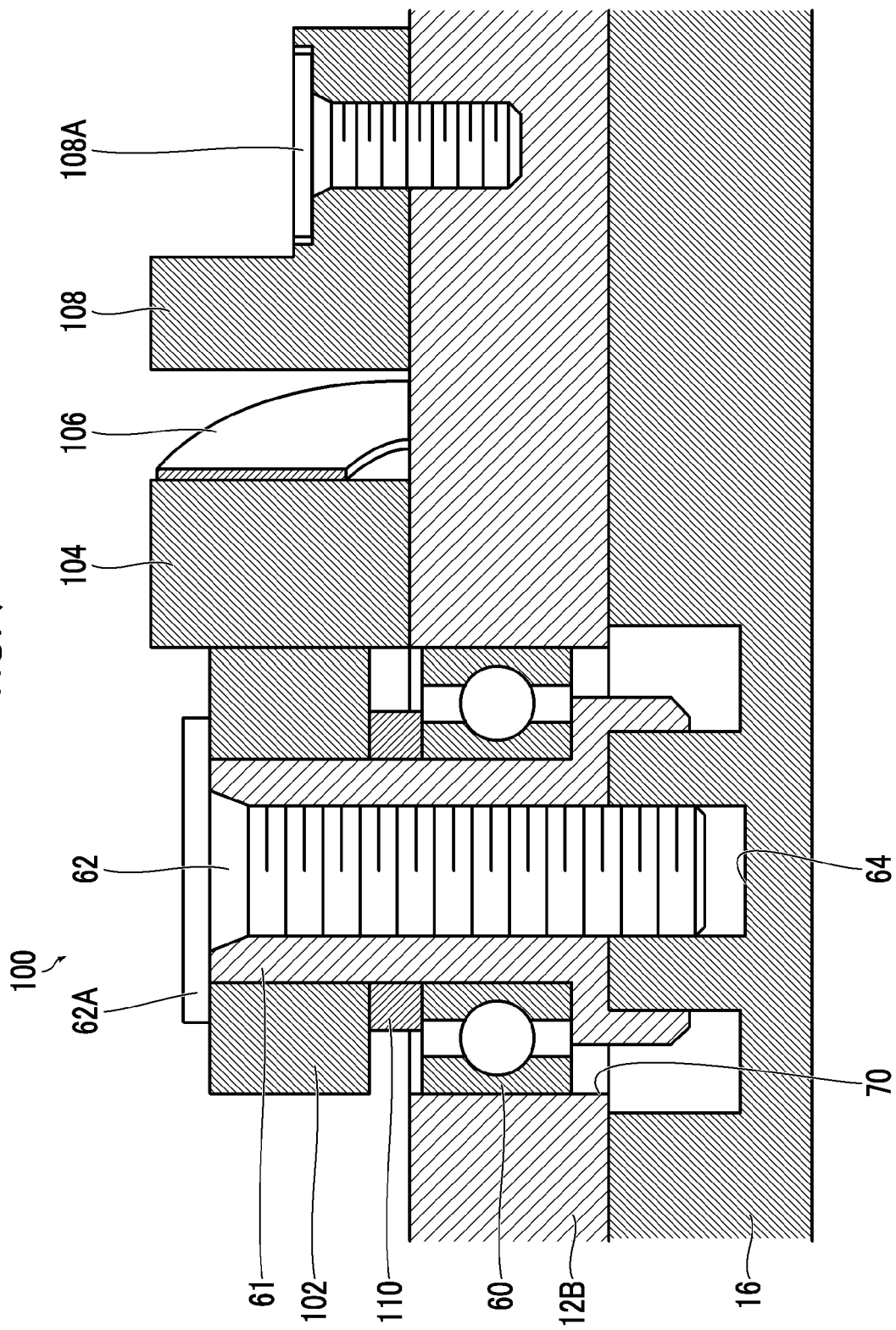
FIG. 9 is a cross-sectional view showing the configuration of the positioning roller and a torque applying roller.

FIG. 7 is a cross-sectional view of the interchangeable lens at a location where the positioning roller is installed. FIG. 8 is an enlarged cross-sectional view of an installation portion of the positioning roller. FIG. 9 is a cross-sectional view showing the configuration of the positioning roller and the torque applying roller.

The positioning roller 60 is composed of a bearing (rolling bearing such as a ball bearing). An inner ring portion of the positioning roller 60 is lightly press-fitted to a roller support shaft 61 provided on the cam cylinder 16 and is mounted on the roller support shaft 61. An outer ring portion of the positioning roller 60 mounted on the roller support shaft 61 is rotatably supported.

The roller support shaft 61 has a cylindrical shape. A screw 62 is passed through a hollow portion of the roller support shaft 61, and the roller support shaft 61 is screwed to an outer peripheral portion of the cam cylinder 16. The outer peripheral portion of the cam cylinder 16 is provided with a screw hole 64 at a location where the roller support shaft 61 is attached.

<Positioning Groove>

As shown in FIG. 4, the positioning groove 70 is composed of a straight-shaped groove disposed along the circumferential direction. The positioning groove 70 is provided at three locations on the peripheral surface of the second fixed cylinder 12B. A disposition interval of the positioning grooves 70 is the same as the disposition interval of the positioning rollers 60. That is, the straight advance grooves 50 are disposed at equal intervals along the circumferential direction. The positioning groove 70 is an example of a second groove.

The positioning roller 60 is fitted to the positioning groove 70. As a result, the cam cylinder 16 is positioned in the optical axis direction with respect to the second fixed cylinder 12B. In addition, the rotation range (movable range) of the cam cylinder 16 is regulated with respect to the second fixed cylinder 12B. The positioning roller 60 is an example of a second roller.

<Driving Unit>

The driving unit 80 rotationally drives the cam cylinder 16. The cam cylinder 16 has a gear portion 16A for driving on the inner peripheral portion at the rear end thereof. The driving unit 80 rotationally drives the gear portion 16A to rotate the cam cylinder 16.

As shown in FIG. 4, the driving unit 80 is attached to the rear end cover 12C of the fixed cylinder 12. The driving unit 80 includes a motor and a reduction gear, and these are assembled into a case 82 to be unitized.

Figure 10:
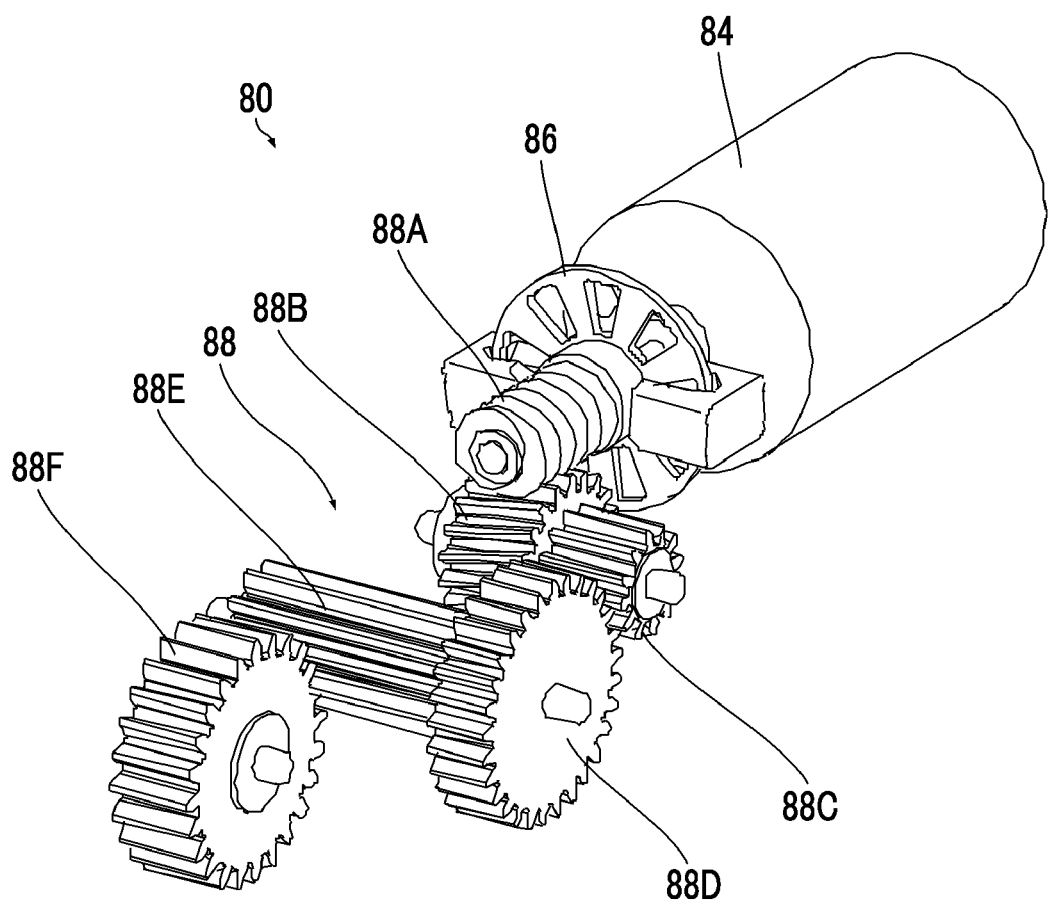
FIG. 10 is a perspective view showing a schematic configuration of a driving unit with a case removed.
Figure 11:
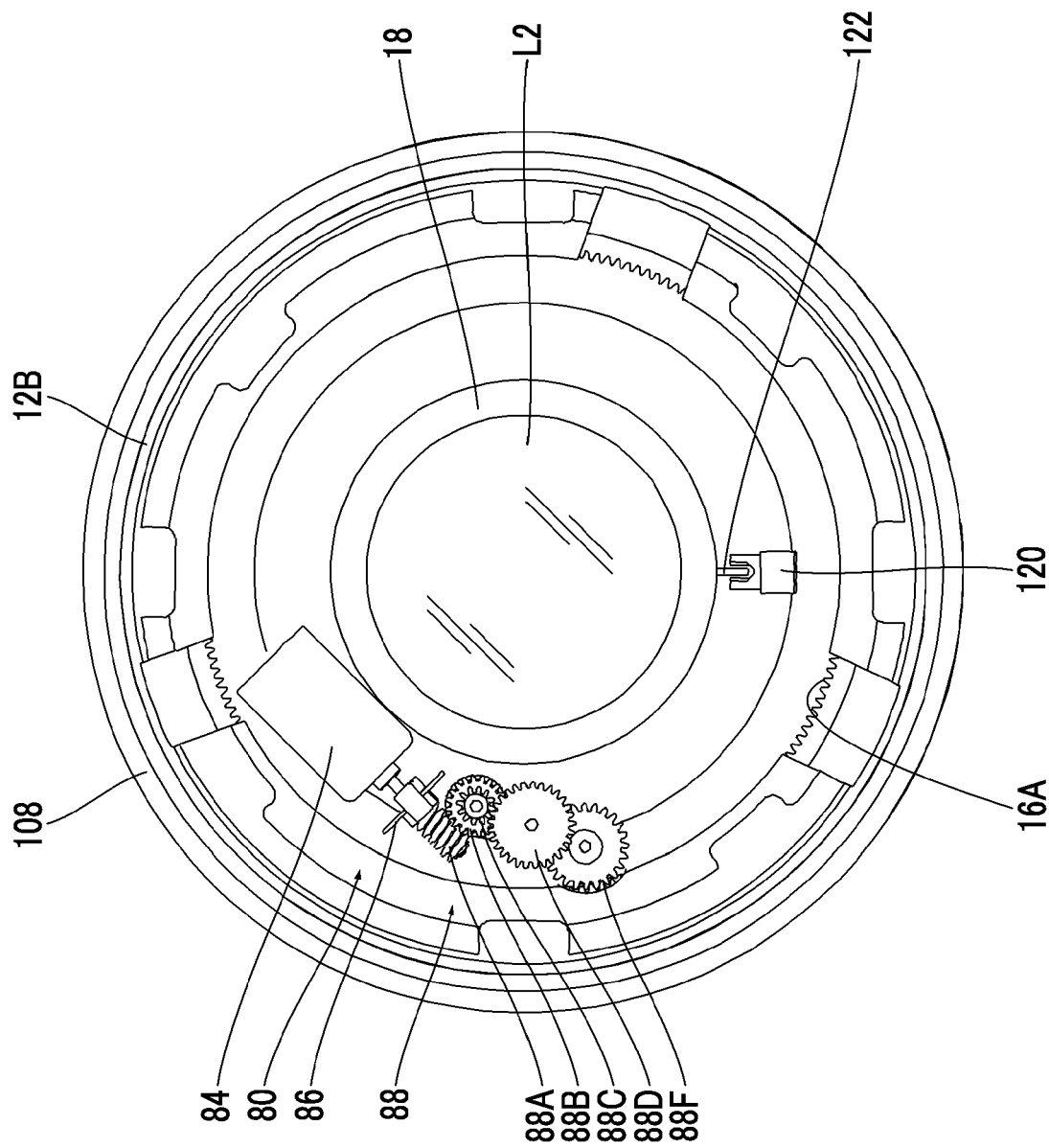
FIG. 11 is a diagram showing a state in which a motor and a reduction gear are attached to the lens barrel.
Figure 12:
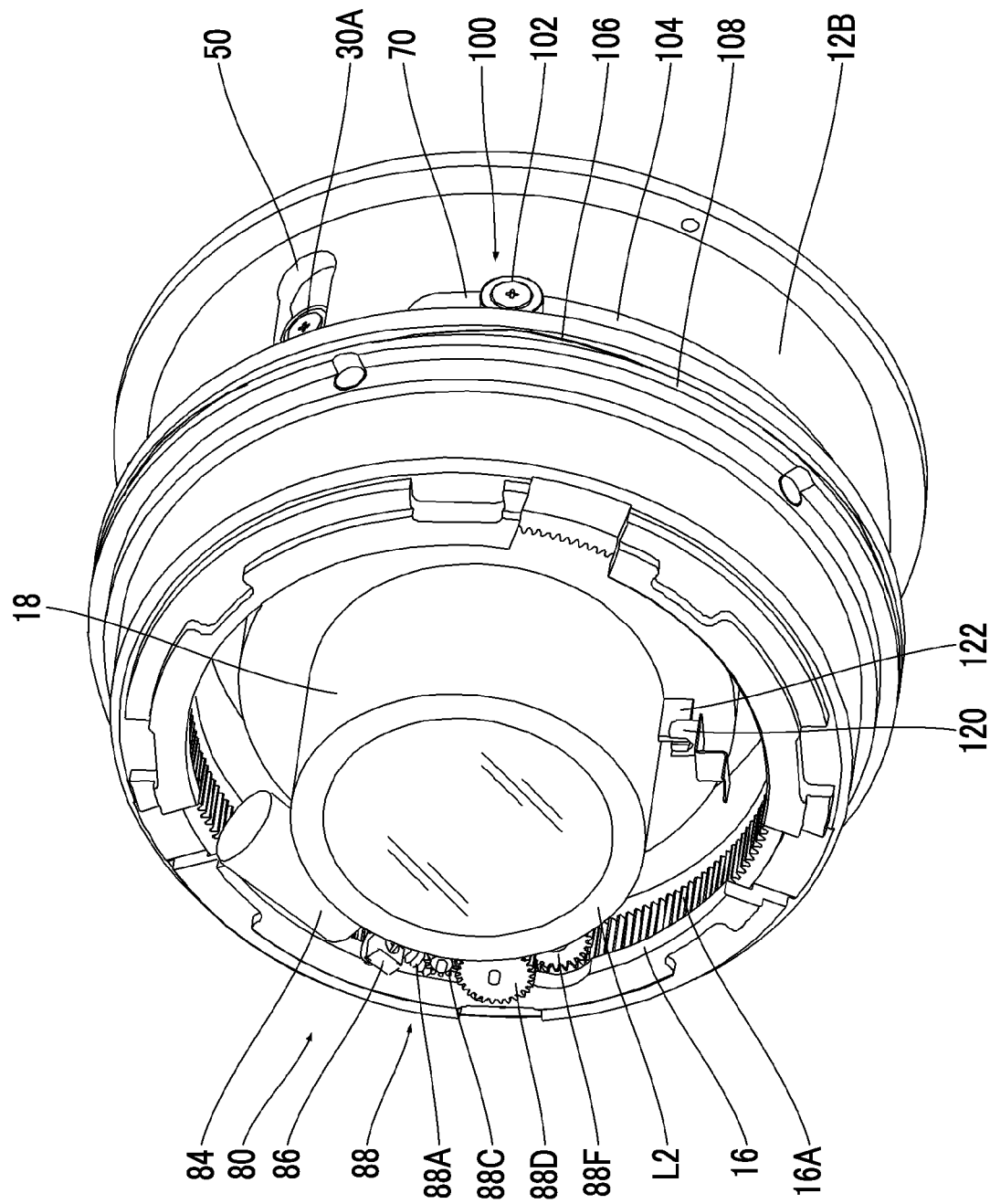
FIG. 12 is a diagram showing the state in which the motor and the reduction gear are attached to the lens barrel.

FIG. 10 is a perspective view showing a schematic configuration of the driving unit with the case removed. FIGS. 11 and 12 are diagrams showing the state in which the motor and the reduction gear are attached to the lens barrel. FIG. 11 corresponds to a rear view of the lens barrel with the exterior body removed. In addition, FIG. 12 corresponds to a rear perspective view of the rear portion of the lens barrel with the exterior body removed. FIGS. 11 and 12 show a state in which the rear end cover 12C of the fixed cylinder 12 and the case 82 of the driving unit 80 are omitted for convenience.

As described above, the driving unit 80 has a motor 84 and a reduction gear 88 that reduces the speed of rotation of the motor 84. The driving unit 80 is an example of a driving unit.

The motor 84 is composed of, for example, a stepping motor. The motor 84 comprises an encoder 86 for detecting the rotation speed.

The reduction gear 88 has a gear train. The gear train is composed of a combination of a plurality of gears 88A to 88F. The reduction gear 88 of the present embodiment includes a worm gear in a part of the gear train. The worm gear is composed of a worm and a worm wheel. In the reduction gear 88 of the present embodiment, the gear 88A connected to an output shaft of the motor 84 is composed of a worm. The final gear 88F constitutes a driving gear. The driving unit 80 is attached to the rear end cover 12C, whereby the driving gear 88F is engaged with the gear portion 16A of the cam cylinder 16. As a result, in a case where the motor 84 is driven, the rotation of the motor 84 is transmitted to the gear portion 16A of the cam cylinder 16 via the reduction gear 88, and the cam cylinder 16 is rotated.

<Torque Applying Mechanism>

The torque applying mechanism 100 applies a load torque to the rotation of the cam cylinder 16. As shown in FIG. 4, the torque applying mechanism 100 has a torque applying roller 102 provided in the cam cylinder 16, a biasing ring 104 that is pressed to abut against the torque applying roller 102, a biasing spring 106 for biasing the biasing ring 104, and a spring support frame 108 for supporting the biasing spring 106.

The torque applying roller 102 is composed of a cylindrical body (so-called normal roller). As shown in FIG. 9, the torque applying roller 102 is supported by the roller support shaft 61 provided on the cam cylinder 16. More specifically, the roller support shaft 61 is fitted to the inner peripheral portion of the torque applying roller 102, whereby the torque applying roller 102 is mounted on the roller support shaft 61 and rotatably supported with respect to the roller support shaft 61.

As described above, the roller support shaft 61 is also a shaft that supports the positioning roller 60. The torque applying roller 102 is mounted on the roller support shaft 61 via a spacer 110 on the positioning roller 60. The torque applying roller 102 mounted on the roller support shaft 61 is rotatably supported by being prevented from slipping off by a head portion 62A of the screw 62 for fixing the roller support shaft 61.

Unlike the positioning roller 60 composed of a bearing, the torque applying roller 102 is only fitted to the roller support shaft 61, so that a load is generated during the rotation. Specifically, a load is generated in the rotation due to friction (rotational friction) between an inner peripheral portion of the torque applying roller 102 and an outer peripheral portion of the roller support shaft 61. Since friction is generated between the torque applying roller 102 and the roller support shaft 61 in this way, it is preferable to select a material resistant to wear for the torque applying roller 102 and the roller support shaft 61. For example, one of the torque applying roller 102 and the roller support shaft 61 may be made of stainless steel, and the other may be made of brass. The torque applying roller 102 may be made of resin. For example, the torque applying roller 102 made of polyacetal having excellent sliding characteristics can also be used. The torque applying roller 102 is an example of a first roller.

As shown in FIG. 4, the biasing ring 104 has a ring shape, is fitted to an outer peripheral portion of the second fixed cylinder 12B, and is mounted on the outer peripheral portion of the second fixed cylinder 12B. The biasing ring 104 mounted on the outer peripheral portion of the second fixed cylinder 12B is held to be movable in the front-rear direction along the optical axis Z. The biasing ring 104 may be made of, for example, anodized aluminum. The biasing ring 104 is an example of a first frame.

The biasing spring 106 is composed of a wave washer. The biasing spring 106 is mounted on the outer peripheral portion of the second fixed cylinder 12B to bias the biasing ring 104 toward the torque applying roller 102. The biasing spring 106 is an example of a biasing member.

As shown in FIG. 4, the spring support frame 108 is composed of a ring-shaped frame. The spring support frame 108 is fitted to the outer peripheral portion of the second fixed cylinder 12B and is mounted on the outer peripheral portion of the second fixed cylinder 12B. The spring support frame 108 mounted on the second fixed cylinder 12B is fixed to the second fixed cylinder 12B by screwing a plurality of locations on the peripheral surface with a screw 108A. The spring support frame 108 is an example of a second frame.

The biasing spring 106 is disposed between the spring support frame 108 and the biasing ring 104, and biases the biasing ring 104 toward the torque applying roller 102. As a result, the biasing ring 104 is pressed to abut against the torque applying roller 102. In addition, in a case where the biasing ring 104 is pressed to abut against the torque applying roller 102, the load torque is applied to the rotation of the cam cylinder 16. In a case where the biasing ring 104 is pressed to abut against the torque applying roller 102, the cam cylinder 16 is biased along the optical axis Z, and the backlash of the cam cylinder 16 with respect to the fixed cylinder 12 is removed.

[Position Detection Mechanism of Second Lens Cylinder]

The position detection mechanism of the second lens cylinder 18 is composed of the encoder 86 provided in the motor 84 and a photo interrupter 120 provided in the fixed cylinder 12.

As described above, the encoder 86 detects the rotation speed of the motor 84. The photo interrupter 120 detects that the second lens cylinder 18 is located at the origin position. The photo interrupter 120 is provided on the rear end cover 12C of the fixed cylinder 12. The photo interrupter 120 detects a light shielding portion 122 provided on the second lens cylinder 18 to detect that the second lens cylinder 18 is located at the origin position.

The position of the second lens cylinder 18 is detected by the following procedure. First, the photo interrupter 120 detects that the second lens cylinder 18 is located at the origin position. The rotation speed of the motor 84 after the detection is detected by the encoder 86. As a result, the position of the second lens cylinder 18 with respect to the origin position is detected. That is, since the amount of movement of the second lens cylinder 18 with respect to the rotation speed of the motor 84 is known, the position of the second lens cylinder 18 with respect to the origin position can be detected by detecting the rotation speed of the motor 84 from the origin position.

[Action of Interchangeable Lens]

In the interchangeable lens 1 of the present embodiment configured as described above, the motor 84 is driven, whereby the second lens group L2, which is a focus lens group, moves in the front-rear direction along the optical axis Z to adjust the focus. More specifically, in a case where the motor 84 is driven, the rotation of the motor 84 is transmitted to the cam cylinder 16, and the cam cylinder 16 is rotated, thereby causing the second lens cylinder 18 that holds the second lens group L2 to move in the front-rear direction along the optical axis Z by the action of the cam.

The rotation of the motor 84 is transmitted to the cam cylinder 16 via the gear train. Therefore, in a case of stopping, the stop position of the second lens cylinder 18 becomes unstable within a range of the backlash due to the influence of the inertia force and gravity of the movable part. However, since the interchangeable lens 1 of the present embodiment comprises the torque applying mechanism 100, high stop accuracy can be ensured. That is, since the torque applying mechanism 100 applies the load torque to the rotation of the cam cylinder 16, the second lens cylinder 18 can be stably stopped even in a case where there is the backlash in the engaging portion of the gear.

The load torque is applied as follows. The cam cylinder 16 comprises the torque applying roller 102. The biasing ring 104 biased by the biasing spring 106 is pressed to abut against the torque applying roller 102. In a case where the cam cylinder 16 is rotated, the torque applying roller 102 rolls along the biasing ring 104. As a result, the rotational friction is generated between the inner periphery of the torque applying roller 102 and the outer periphery of the roller support shaft 61. This rotational friction acts as the load torque for the cam cylinder 16.

As described above, according to the interchangeable lens 1 of the present embodiment, since the load torque is applied to the rotation of the cam cylinder 16, the second lens cylinder 18 can be stably stopped. In addition, since the load torque is generated by the rotational friction of the torque applying roller 102, the load torque can always be applied in a stable state.

The torque applying mechanism 100 also has a function of removing the backlash of the cam cylinder 16. That is, the torque applying roller 102 provided coaxially with the positioning roller 60 is biased in the optical axis direction by the biasing ring 104, whereby the positioning roller 60 is pressed to abut against an inner wall surface of the positioning groove 70. As a result, the backlash of the cam cylinder 16 with respect to the fixed cylinder 12 can be removed. In addition, by sharing the positioning roller 60 and the shaft (roller support shaft 61), the configuration can be simplified.

[Optimization of Load Torque]

The load torque is set to a value that can suppress the rotation due to the inertia force and gravity. As an example, in a case where the torque required to stop the cam cylinder at set deceleration is T1, and the torque required to stop the second lens cylinder at set deceleration is T2 in a case where the second lens cylinder is driven in a direction in which the second lens cylinder falls by its own weight with the lens facing downward or upward, a load torque TF is set so as to satisfy the following conditional expression.

$$TF > (T1 + T2)$$

The torques T1 and T2 are calculated from the deceleration of the motor set by the drive control. Since the coefficient of dynamic friction of the bearing is extremely small, it is ignored in the calculation.

Figure 13:
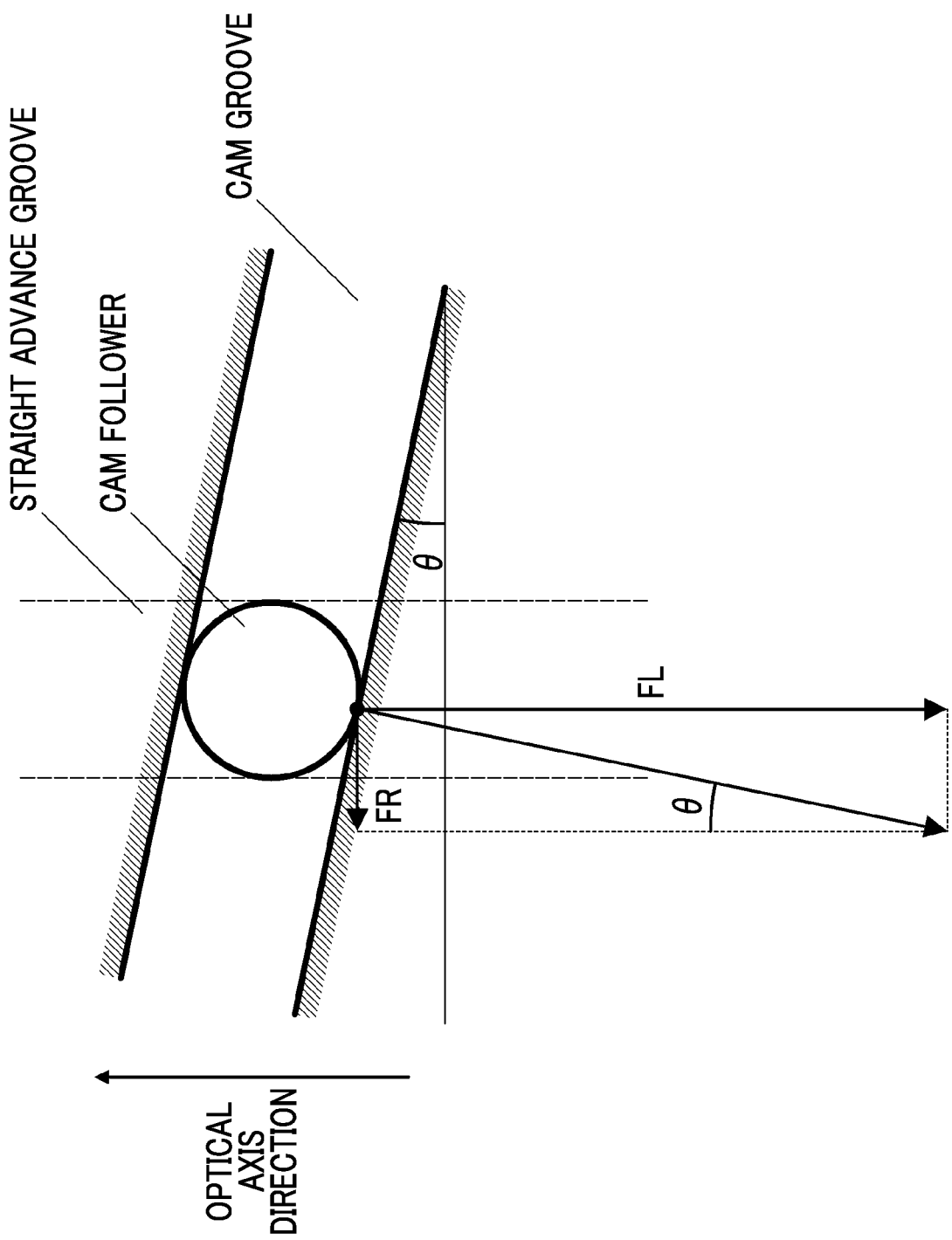
FIG. 13 is an explanatory diagram of a method of calculating torques T1, T2, and T3.

FIG. 13 is an explanatory diagram of a calculation method of torques T1, T2, and T3.
(1) Torque T1
The torque T1 [N·m] is calculated by the following equation.

$$T1 = I \times AC$$

Here, I is the moment of inertia I of the cam cylinder, and AC is the deceleration [rad/s$^2$] of the cam cylinder.

The deceleration AC [rad/s$^2$] of the cam cylinder is calculated by the following equation.

$$AC = AM/RR$$

Here, AM is the deceleration [rad/s$^2$] of the motor. In addition, RR is the reduction ratio. The reduction ratio RR is calculated by the following equation.
RR=rotation speed of motor/rotation speed of cam cylinder
(2) Torque T2
The torque T2 [N·m] is calculated by the following equation.

$$T2 = FR \times R$$

Here, FR is the rotation direction component force [N] of the cam cylinder, as shown in FIG. 13. In addition, R is the distance [m] from the center of rotation to the cam groove. The rotation direction component force FR [N] of the cam cylinder is calculated by the following equation.

$$FR = \tan(\theta) \times FL$$

Here, θ is the cam angle [rad], as shown in FIG. 13. In addition, FL is the force [N] required to decelerate the second lens cylinder in a case where the second lens cylinder is driven in a direction in which the second lens cylinder falls by its own weight with the lens facing downward or upward. FL [N] is calculated by the following equation.

$$FL = M + (M \times AL)$$

Here, M [Kg] is the total weight of the second lens cylinder including the second lens group. In addition, AL is the deceleration of the second lens cylinder [rad/s$^2$]. AL [rad/s$^2$] is calculated by the following equation.

$$AL = AM \times L$$

Here, AM is the deceleration [rad/s$^2$] of the motor. In addition, L is the cam lead [m/rad]. The cam lead is the amount of movement that proceeds to 1 [rad].
(3) Load Torque TF
The load torque TF [N·m] is calculated by the following equation.

$$TF = W \times \mu \times RM$$

Here, W is the load [N] perpendicular to the friction surface. In addition, μ is the coefficient of dynamic friction of the friction surface. In addition, RM is the distance [m] from the center of rotation of the friction surface.

The load applied to the torque applying roller 102, the coefficient of dynamic friction between the torque applying roller 102 and the roller support shaft 61, and the like are set so that the load torque TF satisfies the above-described conditions. The load applied to the torque applying roller 102 can be adjusted by the spring constant of the biasing spring 106 (power of the biasing spring). The coefficient of dynamic friction can be adjusted by the material and surface roughness of the torque applying roller 102 and the roller support shaft 61.

In a case where the load torque TF satisfies the above-described conditions, the motor can be stopped faster than the deceleration of the motor set by the drive control of the lens, and the state can be maintained. As a result, stable position accuracy can be ensured. The load torque TF is set as small as possible within the range satisfying the above-described conditions, thereby achieving both the drive speed and the stop accuracy.

Figure 14:
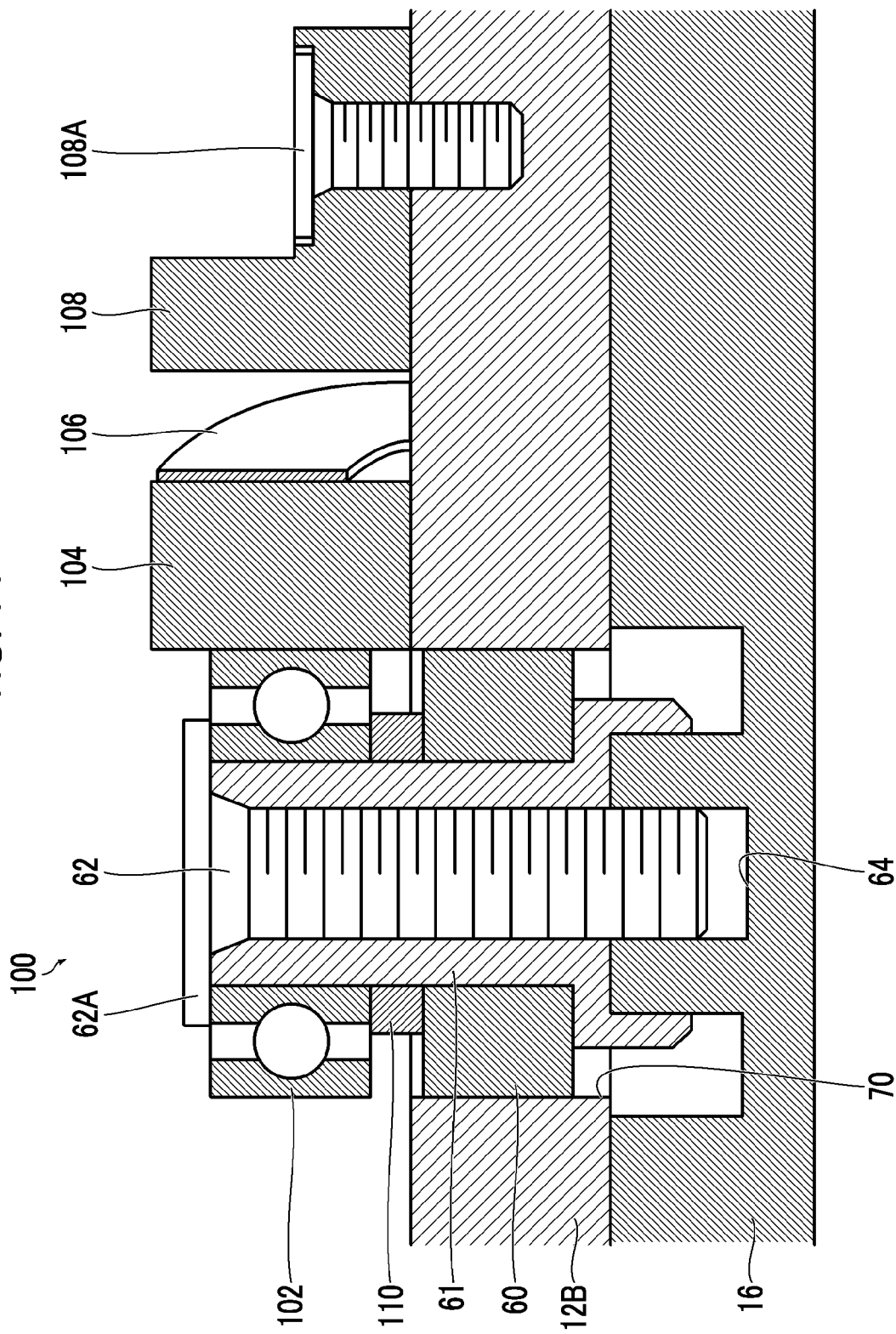
FIG. 14 is a diagram showing a first modification example of a torque applying mechanism.

MODIFICATION EXAMPLE (1) Modification Example of Torque Applying Mechanism (a) First Modification Example FIG. 14 is a diagram showing a first modification example of the torque applying mechanism.

In the torque applying mechanism 100 of the above embodiment, the torque applying roller (first roller) 102 and the positioning roller (second roller) 60 share the roller support shaft 61.

In the configuration in which the torque applying roller 102 and the positioning roller 60 share the roller support shaft 61, as shown in FIG. 14, the same operation and effect can be obtained also in a case where the torque applying roller 102 is composed of a bearing (roller bearing or the like) and the positioning roller 60 is composed of a so-called normal roller (cylindrical body). In this case, an inner peripheral surface of the positioning roller 60 and an outer peripheral surface of the roller support shaft 61 function as friction surfaces. That is, the frictional force generated between the inner peripheral surface of the positioning roller 60 and the outer peripheral surface of the roller support shaft 61 acts as the load torque.

(b) Second Modification Example

Figure 15:
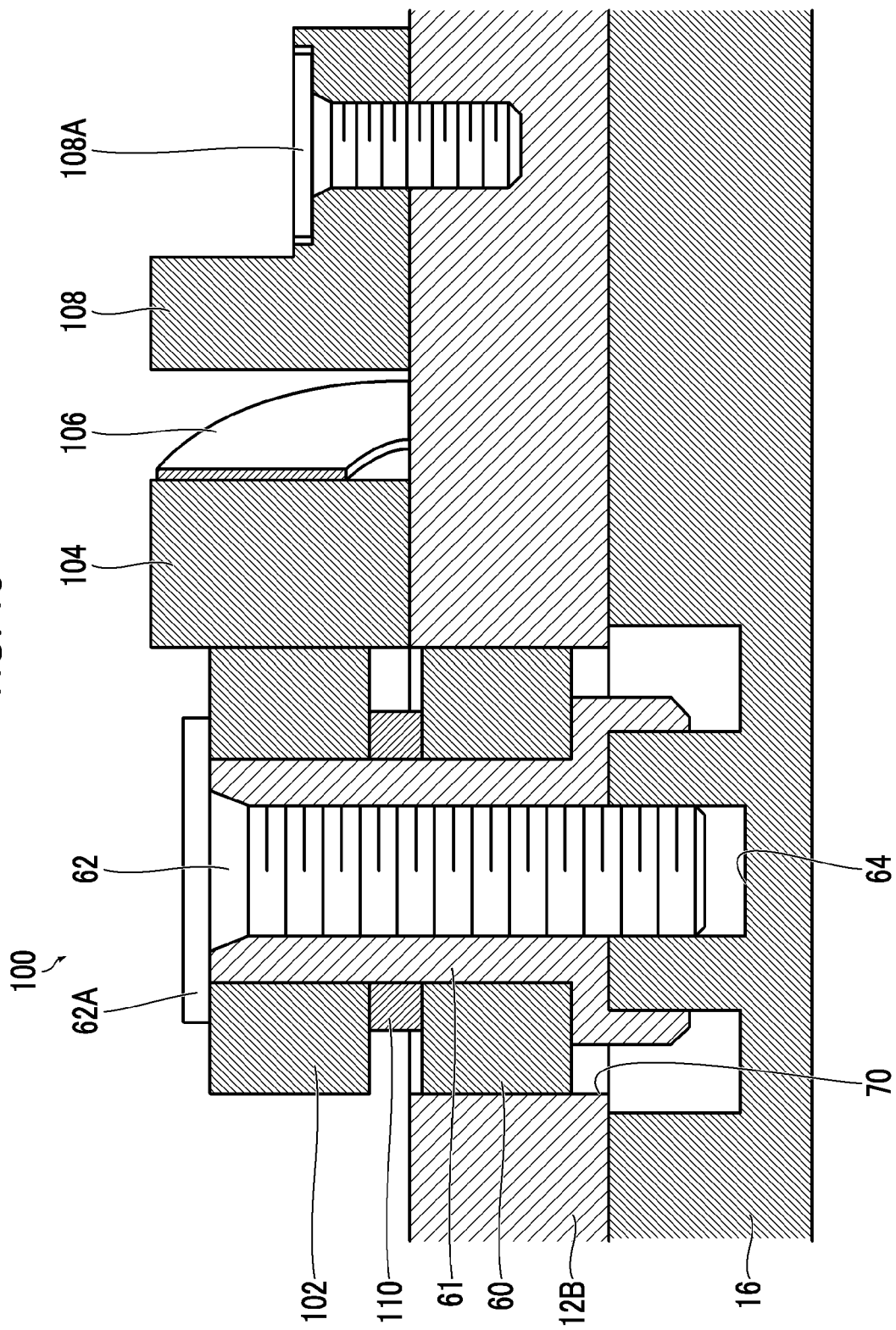
FIG. 15 is a diagram showing a second modification example of the torque applying mechanism.

FIG. 15 is a diagram showing a second modification example of the torque applying mechanism.

In the example shown in FIG. 15, both the torque applying roller 102 and the positioning roller 60 are composed of normal rollers. In this case as well, the same operation and effect can be obtained. In this case, the inner peripheral surfaces of the torque applying roller 102 and the positioning roller 60 and the outer peripheral surface of the roller support shaft 61 function as friction surfaces.

(c) Third Modification Example

Figure 16:
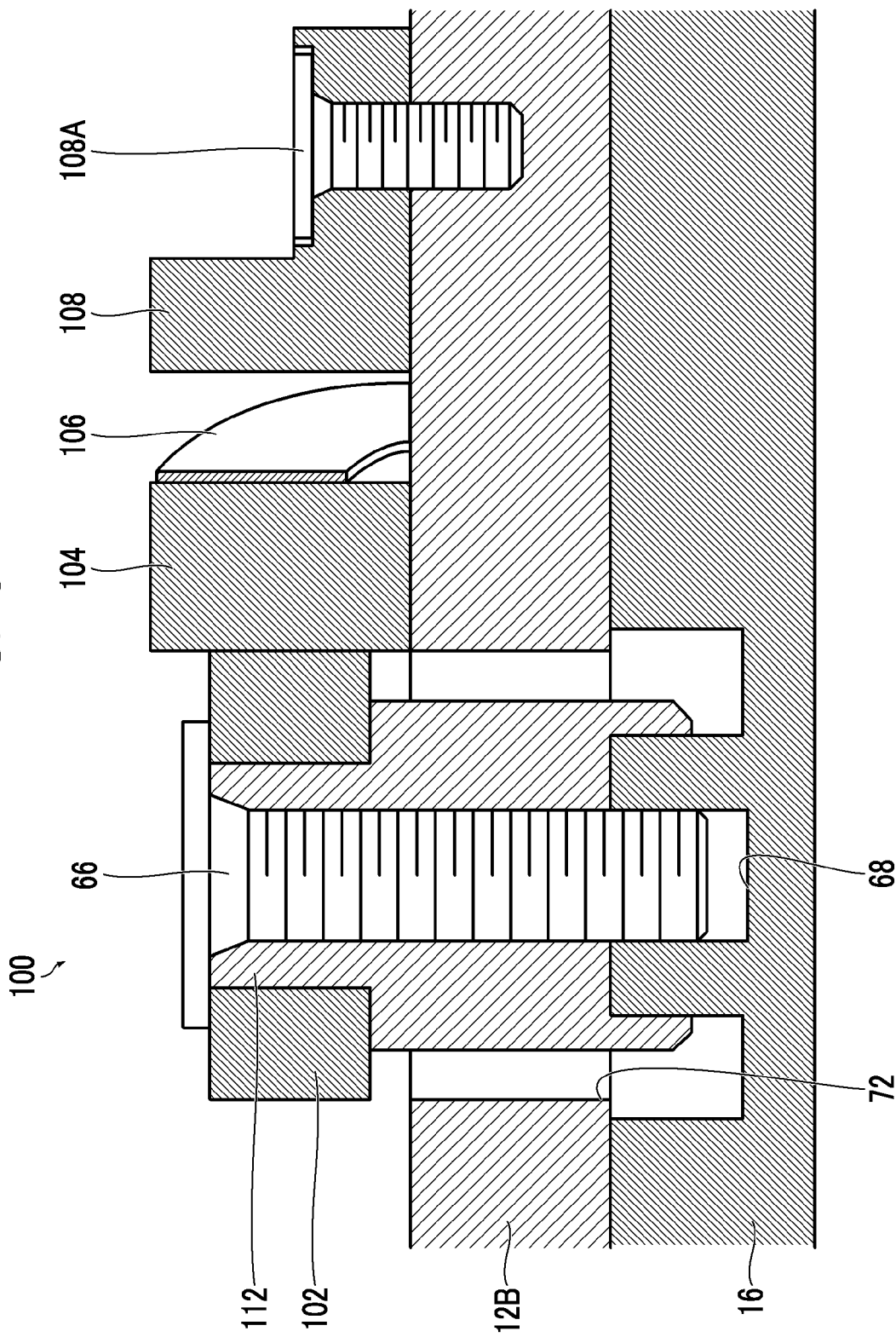
FIG. 16 is a diagram showing a third modification example of the torque applying mechanism.

FIG. 16 is a diagram showing a third modification example of the torque applying mechanism.

FIG. 16 shows an example of a case where the torque applying roller 102 is supported by a dedicated shaft (roller support shaft). As shown in FIG. 16, the roller support shaft 112 that supports the torque applying roller 102 is provided in the cam cylinder 16. The roller support shaft 112 has a cylindrical shape, and a screw 66 is passed through a hollow portion of the roller support shaft 112, and the roller support shaft 112 is screwed to the cam cylinder 16. The cam cylinder 16 is provided with a screw hole 58 at a location where a roller support shaft 102A is attached. In addition, the second fixed cylinder 12B is provided with a groove 72 through which the roller support shaft 102A is passed. The groove 72 is disposed along the circumferential direction.

As described above, the torque applying roller 102 can be provided separately from the positioning roller 60. In a case where the torque applying roller 102 and the positioning roller 60 share the shaft as in the above embodiment, the configuration can be simplified.

(d) Modification Example 4

In the above embodiment, the spring support frame 108, which is a support portion of the biasing spring 106, is attached to the second fixed cylinder 12B with the screw 108A, but the support portion of the biasing spring 106 may be provided integrally with the second fixed cylinder 12B.

Figure 17:
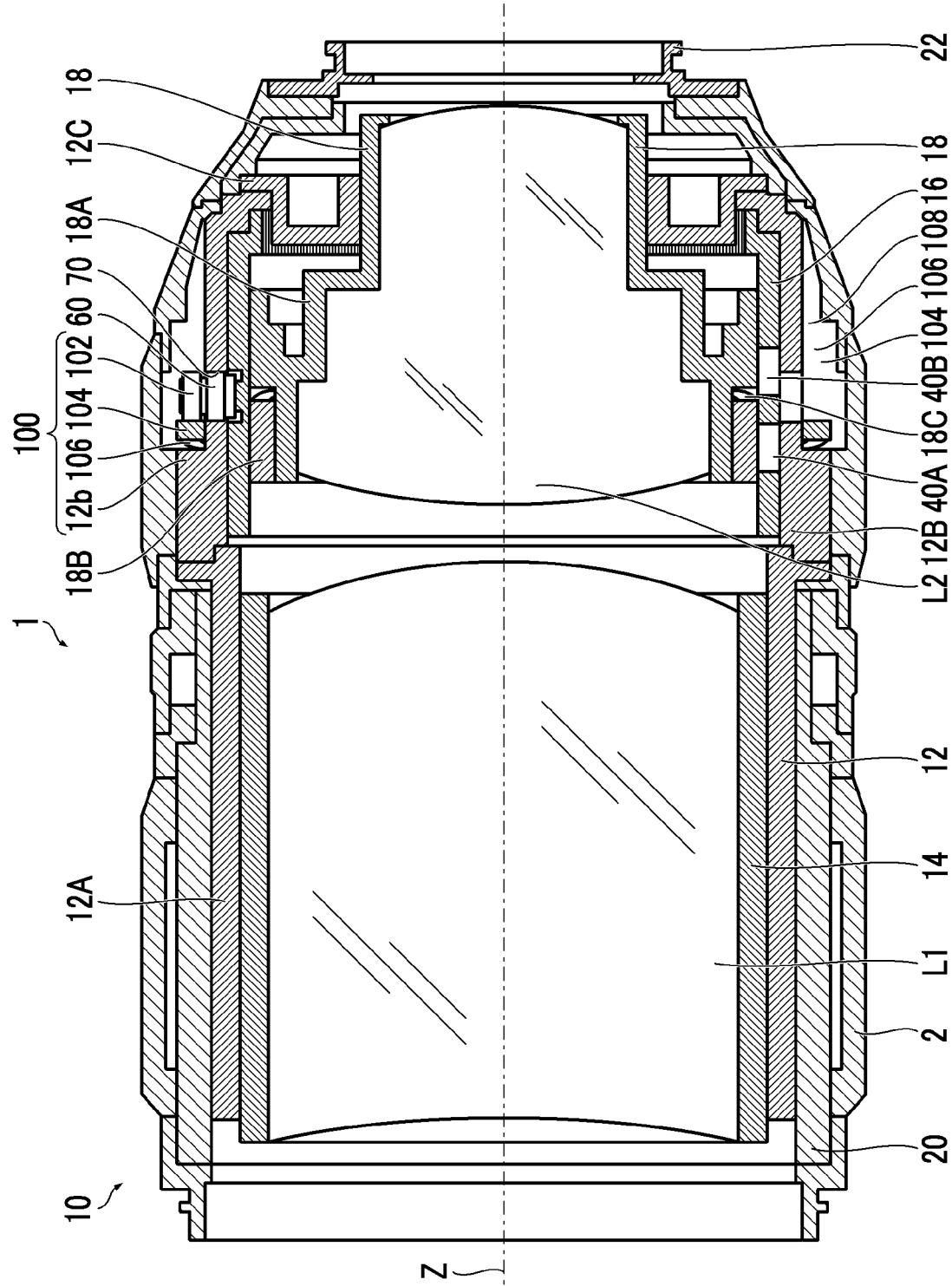
FIG. 17 is a diagram showing a modification example of a support portion of a biasing spring.

FIG. 17 is a diagram showing a modification example of the support portion of the biasing spring.

In the example shown in FIG. 17, the second fixed cylinder 12B has a flange portion 12b on the outer peripheral portion, and the flange portion 12b functions as the support portion of the biasing spring 106. The biasing spring 106 is disposed between the biasing ring 104 and the flange portion 12b, and biases the biasing ring 104 in the direction of the torque applying roller 102 along the optical axis Z.

In the example shown in FIG. 17, an example of a case where the torque applying roller 102 is biased from the front side is shown. That is, the biasing ring 104 is disposed on the front side of the torque applying roller 102 to bias the torque applying roller 102 from the front side. In this way, the torque applying roller 102 can be biased from the front side.

In this way, in a case where the support portion of the biasing spring 106 is integrated with the second fixed cylinder 12B, the configuration can be simplified. On the other hand, in a case where the spring support frame 108 is configured to be attached to and detached from the second fixed cylinder 12B as in the above embodiment, the assemblability and maintainability can be improved.

In the above embodiment, the biasing spring 106 is composed of a wave washer, but the configuration of the biasing spring is not limited to this. In addition, for example, the biasing spring 106 may be composed of a coil spring or the like.

(2) Modification Example of Adjustment Method of Load Torque

The load torque applied by the torque applying mechanism 100 can also be adjusted by the number of torque applying rollers 102 to be installed. That is, the number of torque applying rollers 102 to be installed is increased or decreased according to the required load torque.

Figure 18:
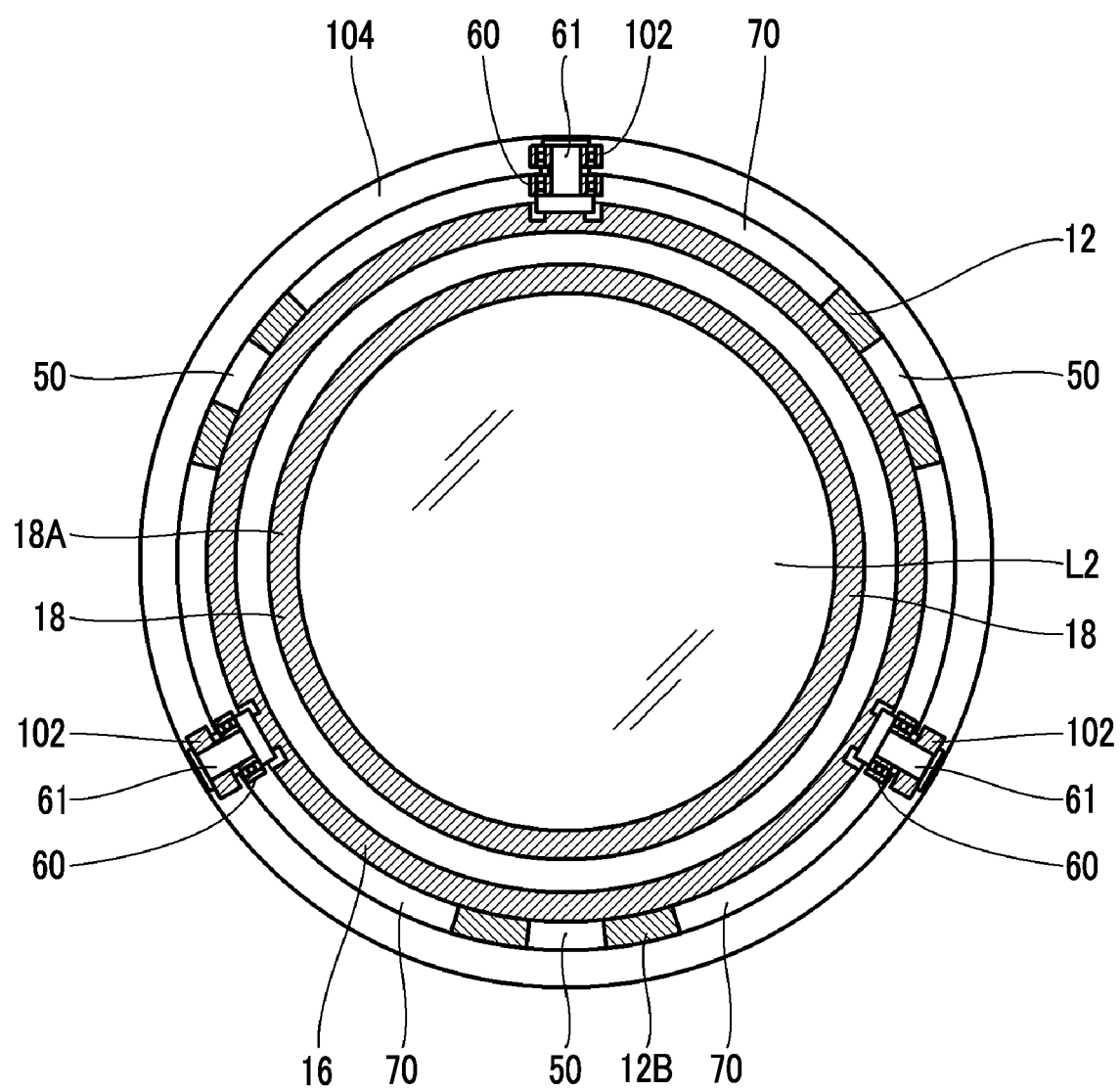
FIG. 18 is an explanatory view of a method of adjusting a load torque by adjusting the number of torque applying rollers to be installed.

In a case where the torque applying roller 102 is attached to the roller support shaft 61 on which the positioning roller 60 is supported as in the above embodiment, rollers (normal rollers) used as the torque applying roller 102 are replaced with bearings, whereby the number of rollers to be installed can be adjusted. FIG. 18 is an explanatory view of a method of adjusting the load torque by adjusting the number of torque applying rollers to be installed. FIG. 18 shows an example of a case where one of the three torque applying rollers 102 is replaced with a bearing.

In the configuration in which the torque applying roller 102 and the positioning roller 60 share the roller support shaft 61, the load torque can be adjusted by replacing the roller constituting the positioning roller 60 with a normal roller from a bearing.

(3) Modification Example of Lens Barrel

In the above embodiment, the second lens cylinder 18 is driven by the pair of cam followers 30A and 30B and the pair of cam grooves 40A and 40B, but the second lens cylinder 18 may be driven by one cam follower and one cam groove.

Second Embodiment

Figure 19:
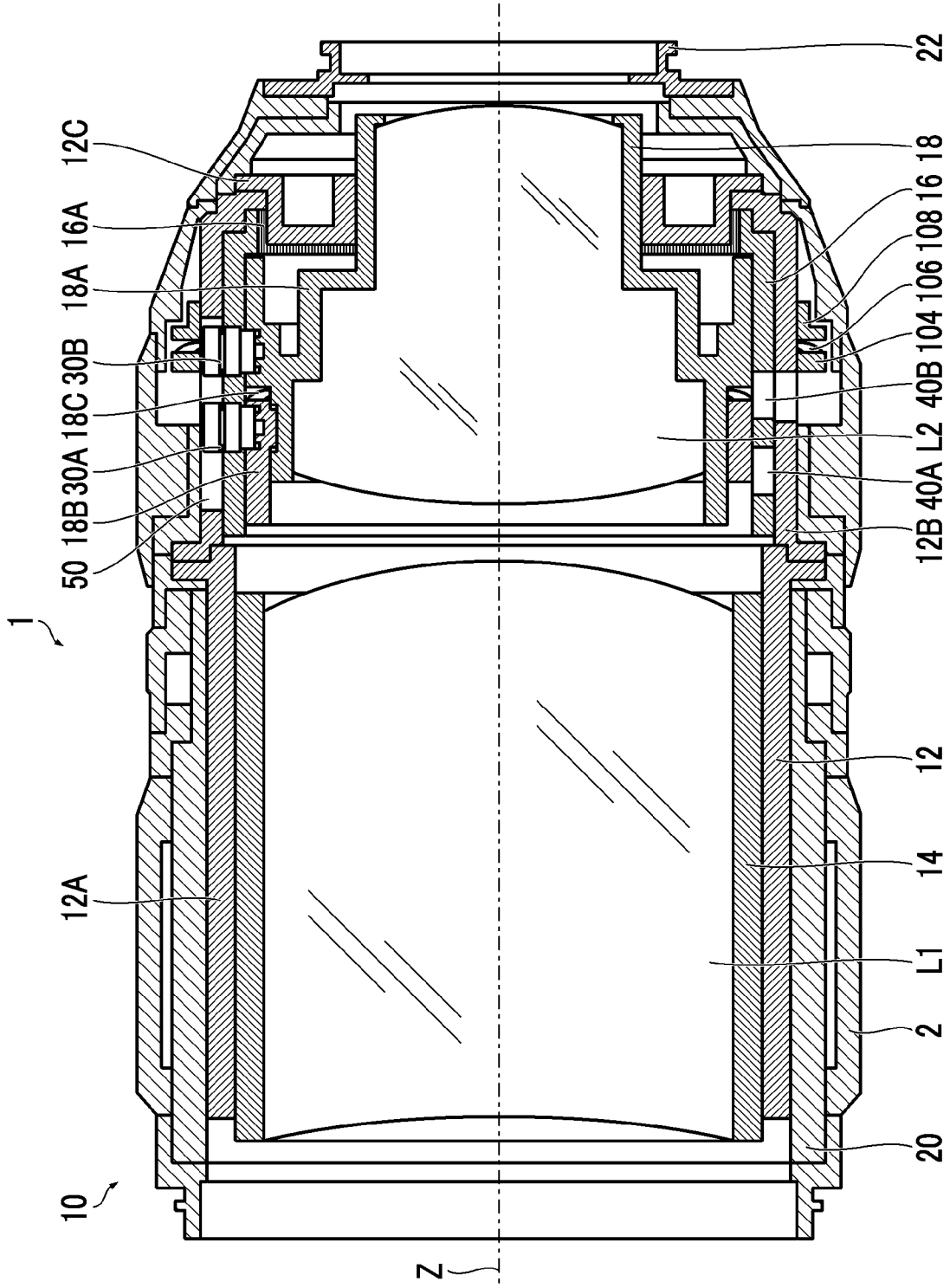
FIG. 19 is a cross-sectional view showing an overall schematic configuration of an interchangeable lens according to a second embodiment.

FIG. 19 is a cross-sectional view showing an overall schematic configuration of an interchangeable lens according to the second embodiment.

In the interchangeable lens 1 of the present embodiment, the configuration of the second lens cylinder 18 is different from the configuration of the interchangeable lens of the first embodiment. In the interchangeable lens 1 of the present embodiment, the second lens cylinder 18 is configured to shield opening portions of the pair of cam grooves 40A and 40B provided in the cam cylinder 16 in the entire movable area. That is, at any position, the second lens cylinder 18 is configured to shield the opening portions of the pair of cam grooves 40A and 40B.

First, for comparison, a relationship between the cam cylinder 16 and the second lens cylinder 18 in the interchangeable lens 1 of the first embodiment will be described.

(1) Interchangeable Lens of First Embodiment

Figure 20:
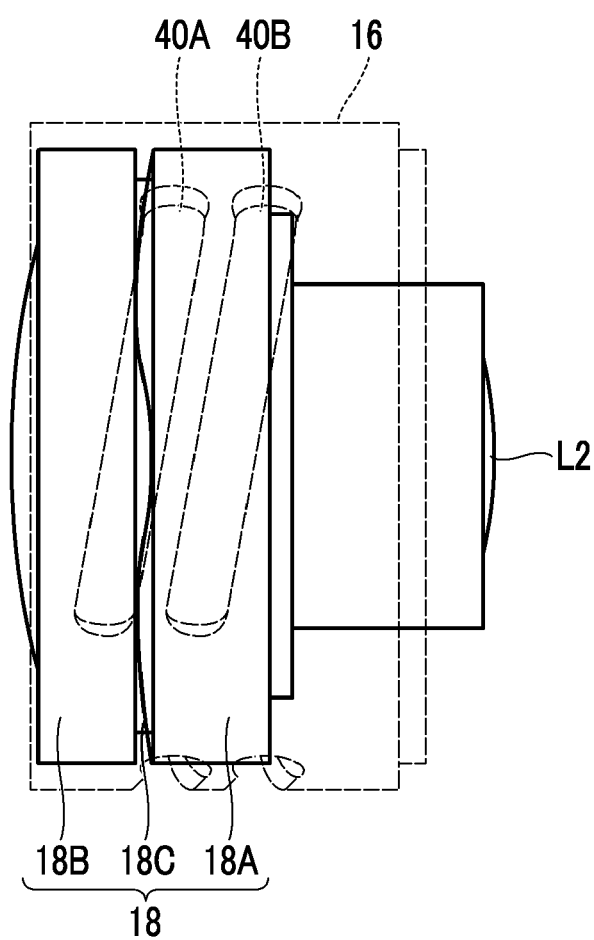
FIG. 20 is a diagram showing a relationship between a cam cylinder and a second lens cylinder in a case where the second lens cylinder is moved to the foremost side in the interchangeable lens of the first embodiment.
Figure 21:
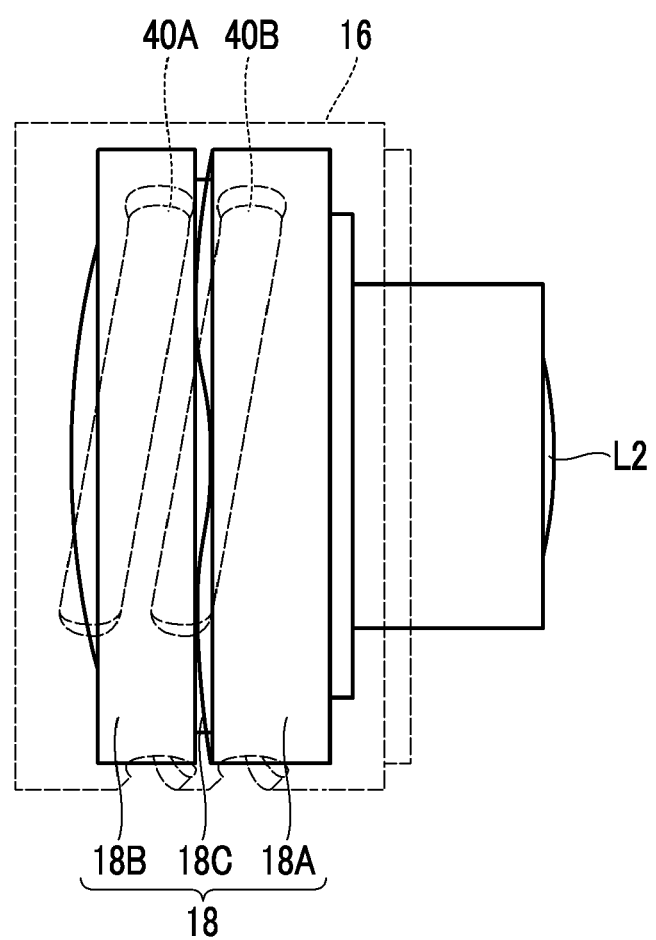
FIG. 21 is a diagram showing a relationship between the cam cylinder and the second lens cylinder in a case where the second lens cylinder is moved to the rearmost side in the interchangeable lens of the first embodiment.

FIG. 20 is a diagram showing a relationship between the cam cylinder and the second lens cylinder in a case where the second lens cylinder is moved to the foremost side in the interchangeable lens of the first embodiment. In addition, FIG. 21 is a diagram showing a relationship between the cam cylinder and the second lens cylinder in a case where the second lens cylinder is moved to the rearmost side in the interchangeable lens of the first embodiment. In FIG. 21, the broken line indicates the cam cylinder 16, and the solid line indicates the second lens cylinder 18. In addition, in FIG. 21, the cam follower is omitted for convenience.

As shown in FIG. 20, in the interchangeable lens 1 of the first embodiment, in a case where the second lens cylinder 18 is moved to the foremost side, a rear end portion (the end part on the rear side in the optical axis direction) of the second cam groove 40B is opened without being shielded by the second lens cylinder 18.

As shown in FIG. 21, in a case where the second lens cylinder 18 is moved to the rearmost side, a front end portion (the end part on the front side in the optical axis direction) of the first cam groove 40A is opened without being shielded by the second lens cylinder 18.

(2) Interchangeable Lens of Second Embodiment

Next, a relationship between the cam cylinder 16 and the second lens cylinder 18 in the interchangeable lens 1 of the present embodiment will be described.

Figure 22:
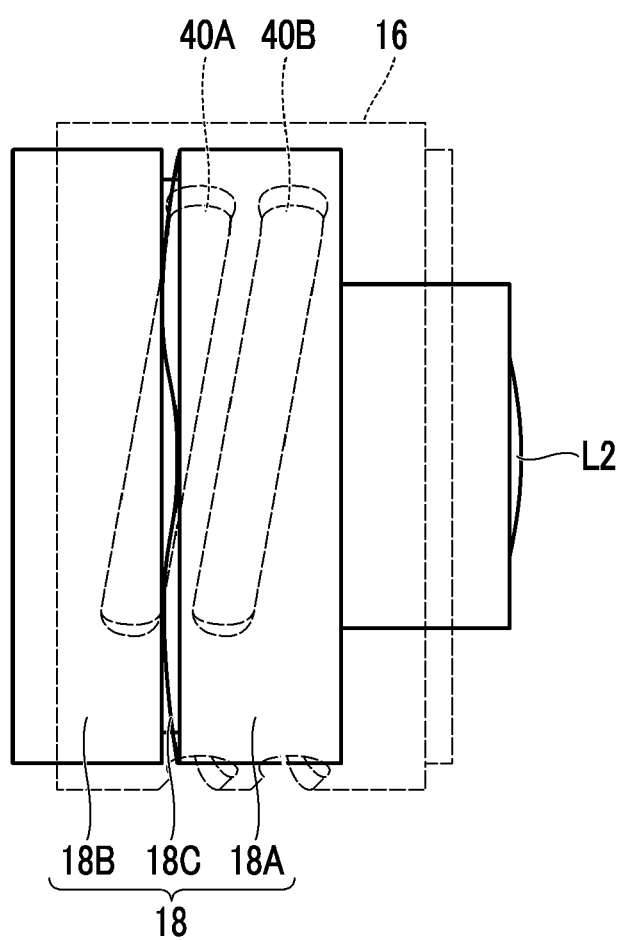
FIG. 22 is a diagram showing a relationship between a cam cylinder and a second lens cylinder in a case where the second lens cylinder is moved to the foremost side in the interchangeable lens of the second embodiment.
Figure 23:
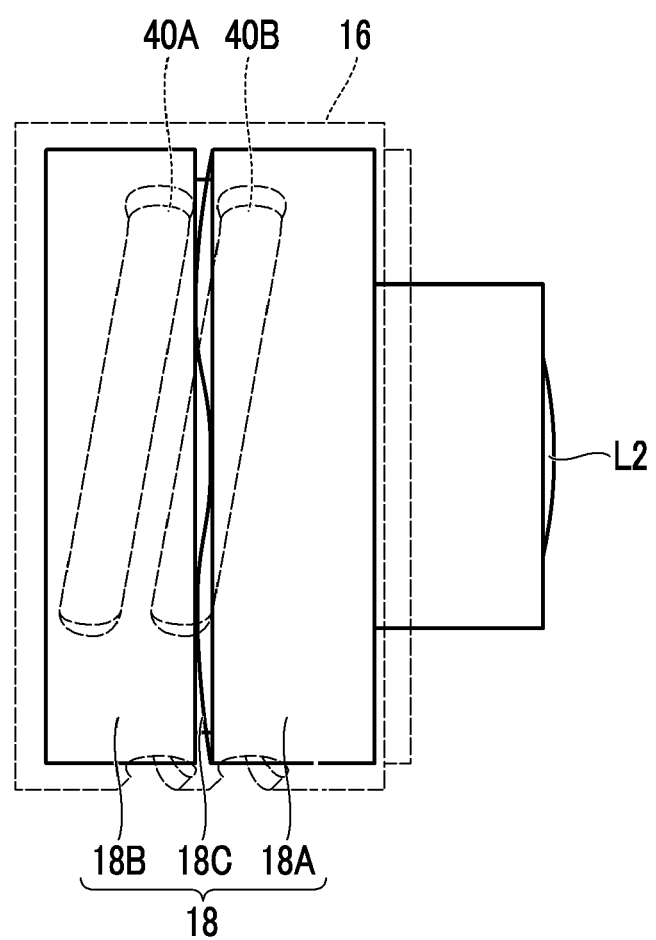
FIG. 23 is a diagram showing a relationship between the cam cylinder and the second lens cylinder in a case where the second lens cylinder is moved to the rearmost side in the interchangeable lens of the second embodiment.

FIG. 22 is a diagram showing a relationship between the cam cylinder and the second lens cylinder in a case where the second lens cylinder is moved to the foremost side in the interchangeable lens of the present embodiment. FIG. 23 is a diagram showing a relationship between the cam cylinder and the second lens cylinder in a case where the second lens cylinder is moved to the rearmost side in the interchangeable lens of the present embodiment. In FIG. 23, the broken line indicates the cam cylinder 16, and the solid line indicates the second lens cylinder 18. In addition, in FIG. 23, the cam follower is omitted for convenience.

As shown in FIG. 22, in a case of the interchangeable lens 1 of the present embodiment, in a case where the second lens cylinder 18 is moved to the foremost side, the opening portion of each of the pair of cam grooves 40A and 40B provided in the cam cylinder 16 is shielded by the second lens cylinder 18. As shown in FIG. 23, in a case where the second lens cylinder 18 is moved to the rearmost side, similarly, the opening portion of each of the pair of cam grooves 40A and 40B provided in the cam cylinder 16 is shielded by the second lens cylinder 18.

As described above, in the interchangeable lens 1 of the present embodiment, the opening portions of the pair of cam grooves 40A and 40B are shielded by the second lens cylinder 18 in the entire movable area of the second lens cylinder 18. As a result, it is possible to prevent dust from entering the inside of the cam cylinder 16 via the cam grooves 40A and 40B. In particular, in a case where a friction portion is provided on the outside of the cam cylinder 16 as in the interchangeable lens 1 of the present embodiment, the friction powder can be prevented from entering the cam cylinder 16, so that the present invention works effectively.

The second lens cylinder 18 shields the opening portions of the cam grooves 40A and 40B in the entire movable area by adjusting the length (length in the optical axis direction) of the portion of the second lens cylinder 18 fitted to the inner peripheral surface of the cam cylinder 16. That is, the fitting portion overlaps the cam grooves 40A and 40B.

In a case where the second lens cylinder 18 has the movable part 18B as in the interchangeable lens 1 of the present embodiment, the function of shielding the opening portion of the first cam groove 40A can be realized by adjusting the length of the movable part 18B.

Other Embodiments

In the above embodiment, a case where the present invention is applied to the interchangeable lens of the lens interchangeable camera has been described as an example, but the application of the present invention is not limited to this. For example, the present invention can be applied to a lens barrel of a lens-integrated camera (a camera in which a lens is integrally provided in a camera body). In addition to the camera, the present invention can also be applied to a lens barrel of a microscope, a telescope, or the like. The camera includes various cameras such as a still camera, a video camera, a television camera, and a cine camera, and further includes a device having a camera function (for example, a mobile phone with a camera, a smartphone, and a tablet computer).

In the above embodiment, a case where the driving unit is built in the lens barrel has been described as an example, but the driving unit may be provided outside the lens barrel. For example, in the lens interchangeable camera, the same can be applied to a case where the driving unit (motor) is provided on the camera body side, and the rotational power is obtained from the camera body side to rotationally drive the cam cylinder.

In the above embodiment, the driving unit is composed of a motor with a so-called reduction gear, but the configuration of the driving unit is not limited to this. As described above, in the motor with the reduction gear having the gear train, in a case of stopping, the stop position of the second lens cylinder 18 becomes unstable within a range of the backlash due to the influence of the inertia force and gravity of the movable part. Therefore, the present invention works particularly effectively.

EXPLANATION OF REFERENCES

1: interchangeable lens
2: focus ring
10: lens barrel
12: fixed cylinder
12A: first fixed cylinder
12B: second fixed cylinder
12C: rear end cover
12b: flange portion
14: first lens cylinder
16: cam cylinder
16A: gear portion
18: second lens cylinder
18A: body part
18B: movable part
18C: biasing spring (wave washer)
18a: fitting portion
20: exterior body
22: mount
24: protrusion
26: groove portion
26A: introduction portion
26B: regulation portion
30A: cam follower (first cam follower)
30B: cam follower (second cam follower)
31: shaft portion
32A: bearing (first bearing)
32B: bearing (second bearing)
33: screw
34: spacer
35: screw hole
40A: cam groove (first cam groove)
40B: cam groove (second cam groove)
40a: inner wall surface
40b: inner wall surface
50: straight advance groove 58: screw hole
60: positioning roller
61: roller support shaft
62: screw
62A: head portion
64: screw hole
66: screw
70: positioning groove
72: groove
80: driving unit
82: case
84: motor
86: encoder
88: reduction gear
88A: gear (worm)
88B: gear
88C: gear
88D: gear
88E: gear
88F: gear (driving gear)
100: torque applying mechanism
102: torque applying roller
102A: roller support shaft
104: biasing ring
106: biasing spring (wave washer)
108: spring support frame
108A: screw
110: spacer
112: roller support shaft
120: photo interrupter
122: light shielding portion
L1: first lens group
L2: second lens group
Z: optical axis

What is claimed is:

1. A lens barrel comprising:
a first cylinder having a first groove disposed along an axial direction and a second groove disposed along a circumferential direction;
a second cylinder having a cam groove and rotatably held by being fitted to an inner peripheral portion of the first cylinder;
a third cylinder accommodated in the second cylinder and held to be movable in the axial direction;
a cam follower attached to an outer peripheral portion of the third cylinder and fitted to the cam groove and the first groove;
a roller support shaft attached to an outer peripheral portion of the second cylinder through the second groove;
a first roller supported by the roller support shaft;
a first frame fitted to an outer peripheral portion of the first cylinder and held to be movable in the axial direction;
a second frame fixedly mounted on the outer peripheral portion of the first cylinder; and
a spring disposed between the first frame and the second frame, wherein the spring biases the first frame in the axial direction and presses the first frame to make the first frame abut against the first roller.

2. The lens barrel according to claim 1, further comprising:
a second roller supported by the roller support shaft and fitted to the second groove to position the second cylinder in the axial direction with respect to the first cylinder and/or regulate a movable range of the second cylinder.

3. The lens barrel according to claim 2,
wherein any one of the first roller or the second roller is composed of a bearing.

4. The lens barrel according to claim 1,
wherein the second cylinder has a pair of the cam grooves disposed in parallel with each other, and
a pair of the cam followers individually fitted to the pair of cam grooves is provided.

5. The lens barrel according to claim 4,
wherein the third cylinder has a third cylinder body part, a third cylinder movable part fitted to an outer peripheral portion of the third cylinder body part and held to be movable in the axial direction, and a biasing part biasing the third cylinder movable part in the axial direction with respect to the third cylinder body part, and
one of the pair of cam followers is attached to the third cylinder movable part, and the other is attached to the third cylinder body part.

6. The lens barrel according to claim 1,
wherein in the second cylinder, an opening portion of the cam groove is shielded by the third cylinder in an entire movable area of the third cylinder.

7. The lens barrel according to claim 5,
wherein in the second cylinder, an opening portion of the cam groove is shielded by the third cylinder body part and the third cylinder movable part in an entire movable area of the third cylinder by mounting the third cylinder movable part on the third cylinder body part.

8. The lens barrel according to claim 1,
wherein the cam follower has
a shaft portion attached to the outer peripheral portion of the third cylinder, and
a bearing mounted on the shaft portion and fitted to the cam groove and the first groove.

9. The lens barrel according to claim 1, further comprising:
a driving unit that rotationally drives the second cylinder.

10. The lens barrel according to claim 9,
wherein the driving unit has
a motor, and
a reduction gear that has a gear train and reduces a speed of rotation of the motor to transmit a speed-reduced rotation to the second cylinder.

11. The lens barrel according to claim 1,
wherein the third cylinder holds a lens in an inner peripheral portion.

* * * * *